United States Patent
Chen et al.

(10) Patent No.: US 12,389,387 B2
(45) Date of Patent: Aug. 12, 2025

(54) DOWNLINK CONTROL INFORMATION ACTIVATION FOR SEMI-PERSISTENT SOUNDING REFERENCE SIGNAL RESOURCE SETS

(71) Applicant: QUALCOMM Incorporated, San Diego, CA (US)

(72) Inventors: Yitao Chen, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 739 days.

(21) Appl. No.: 17/678,598

(22) Filed: Feb. 23, 2022

(65) Prior Publication Data

US 2023/0269725 A1    Aug. 24, 2023

(51) Int. Cl.
*H04W 76/20*    (2018.01)
*H04L 5/00*    (2006.01)
(Continued)

(52) U.S. Cl.
CPC ....... *H04W 72/1263* (2013.01); *H04L 5/0051* (2013.01); *H04W 72/0446* (2013.01);
(Continued)

(58) Field of Classification Search
None
See application file for complete search history.

(56) References Cited

U.S. PATENT DOCUMENTS

2012/0177096 A1    7/2012   Yano et al.
2021/0336664 A1    10/2021  Yang et al.
(Continued)

OTHER PUBLICATIONS

3GPP TS 38.214: "3rd Generation Partnership Project, Technical Specification Group Radio Access Network, NR, Physical Layer Procedures for Data (Release 17)", 3rd Generation Partnership Project, Mobile Competence Centre, 650, Route Des Lucioles, F-06921 Sophia-Antipolis Cedex, France, vol. RAN WG1, No. V17.0.0, Jan. 5, 2022, XP052118411, pp. 1-217, paragraph 8.1.4B.
(Continued)

*Primary Examiner* — Anez C Ebrahim
(74) *Attorney, Agent, or Firm* — Holland & Hart / QUALCOMM Incorporated

(57) ABSTRACT

Methods, systems, and devices for wireless communications are described. In some aspects, a user equipment (UE) and a network entity may support one or more signaling- or configuration-based mechanisms according to which the UE and the network entity may dynamically control a type of semi-persistent SRS resource set associated with activation and deactivation by downlink control information (DCI). The network entity may transmit an indication of a set of semi-persistent SRS resource sets associated with DCI activation to the UE via radio resource control (RRC) signaling and may activate one or more semi-persistent SRS resource sets from the set of semi-persistent SRS resource sets via a DCI message. To facilitate activation by DCI, the UE and the network entity may support a mapping between a set of DCI codepoints and multiple sets of one or more semi-persistent SRS resource sets.

30 Claims, 17 Drawing Sheets

(51) Int. Cl.
*H04W 72/0446* (2023.01)
*H04W 72/1263* (2023.01)
*H04W 72/23* (2023.01)
*H04W 72/51* (2023.01)

(52) U.S. Cl.
CPC ........... *H04W 72/23* (2023.01); *H04W 72/51* (2023.01); *H04W 76/20* (2018.02)

(56) References Cited

U.S. PATENT DOCUMENTS

2021/0360594 A1   11/2021   Park et al.
2023/0198713 A1   6/2023    Grossmann et al.
2024/0163043 A1*  5/2024    Chen ..................... H04W 72/12

OTHER PUBLICATIONS

International Search Report and Written Opinion—PCT/US2023/060324—ISA/EPO—2023-05-02.
Sony: "Summary of SRS", 3GPP TSG RAN WG1 Meeting #92-Bis, R1-1805522, 3GPP, Mobile Competence Centre, 650, Route Des Lucioles, F-06921 Sophia-Antipolis Cedex, France, vol. RAN WG1, No. Sanya, CN, Apr. 16-20, 2018, Apr. 19, 2018, XP051427754, 45 p. p. 28 and continuing to p. 29, Sec. "Sharp", "Text proposal for section 6.2.1 of TS38.214", "6.2.1 UE sounding procedure" p. 44, Sec. "Discussion point 28"p. 27, Sec. "Discussion point 13" p. 32, Sec. "Discussion point 17" p. 7, Sec. "Qualcomm", "In current 38.213, such statements" p. 29, second point.

* cited by examiner

DOWNLINK CONTROL INFORMATION ACTIVATION FOR SEMI-PERSISTENT SOUNDING REFERENCE SIGNAL RESOURCE SETS

FIELD OF TECHNOLOGY

The following relates to wireless communications, including downlink control information (DCI) activation for semi-persistent sounding reference signal (SRS) resource sets.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or network entities, each supporting wireless communication for communication devices, which may be known as user equipment (UE).

In some systems, a UE may transmit a sounding reference signal (SRS) and a network entity may use the SRS for estimation of a channel between the UE and the network entity.

SUMMARY

The described techniques relate to improved methods, systems, devices, and apparatuses that support downlink control information (DCI) activation for semi-persistent sounding reference signal (SRS) resource sets. For example, the described techniques provide for one or more signaling- or configuration-based mechanisms according to which a user equipment (UE) and a network entity may dynamically control a type of semi-persistent SRS resource set associated with activation and deactivation by DCI. For example, the network entity may transmit an indication of a set of semi-persistent SRS resource sets associated with DCI activation to the UE via radio resource control (RRC) signaling and may activate one or more semi-persistent SRS resource sets from the set of semi-persistent SRS resource sets via a DCI message. To facilitate activation by DCI, the UE and the network entity may support a mapping between a set of codepoints and multiple sets of one or more semi-persistent SRS resource sets such that each codepoint corresponds to (and indicates an activation for) a unique set of one or more semi-persistent SRS resource sets.

A method for wireless communication at a UE is described. The method may include receiving control signaling indicating a resource type of a set of SRS resource sets as semi-persistent and indicating that the set of SRS resource sets are associated with DCI activation, receiving a first DCI message indicating an activation of one or more SRS resource sets of the set of SRS resource sets, and transmitting an SRS during each of a set of multiple periodic occasions associated with the one or more SRS resource sets based on the DCI activation of the one or more SRS resource sets and in accordance with the resource type of the one or more SRS resource sets being semi-persistent.

An apparatus for wireless communication at a UE is described. The apparatus may include a processor, memory coupled with the processor, and instructions stored in the memory. The instructions may be executable by the processor to cause the apparatus to receive control signaling indicating a resource type of a set of SRS resource sets as semi-persistent and indicating that the set of SRS resource sets are associated with DCI activation, receive a first DCI message indicating an activation of one or more SRS resource sets of the set of SRS resource sets, and transmit an SRS during each of a set of multiple periodic occasions associated with the one or more SRS resource sets based on the DCI activation of the one or more SRS resource sets and in accordance with the resource type of the one or more SRS resource sets being semi-persistent.

Another apparatus for wireless communication at a UE is described. The apparatus may include means for receiving control signaling indicating a resource type of a set of SRS resource sets as semi-persistent and indicating that the set of SRS resource sets are associated with DCI activation, means for receiving a first DCI message indicating an activation of one or more SRS resource sets of the set of SRS resource sets, and means for transmitting an SRS during each of a set of multiple periodic occasions associated with the one or more SRS resource sets based on the DCI activation of the one or more SRS resource sets and in accordance with the resource type of the one or more SRS resource sets being semi-persistent.

A non-transitory computer-readable medium storing code for wireless communication at a UE is described. The code may include instructions executable by a processor to receive control signaling indicating a resource type of a set of SRS resource sets as semi-persistent and indicating that the set of SRS resource sets are associated with DCI activation, receive a first DCI message indicating an activation of one or more SRS resource sets of the set of SRS resource sets, and transmit an SRS during each of a set of multiple periodic occasions associated with the one or more SRS resource sets based on the DCI activation of the one or more SRS resource sets and in accordance with the resource type of the one or more SRS resource sets being semi-persistent.

In some examples of the method, apparatuses, and non-transitory computer-readable medium described herein, receiving the first DCI message indicating the activation of the one or more SRS resource sets may include operations, features, means, or instructions for receiving, in the first DCI message, a codepoint of the set of multiple codepoints corresponding to the one or more SRS resource sets in accordance with the mapping.

In some examples of the method, apparatuses, and non-transitory computer-readable medium described herein, the control signaling indicates a radio network temporary identifier (RNTI) associated with a scrambling of activation DCI messages for SRS resource sets having the resource type of semi-persistent and the method, apparatuses, and non-transitory computer-readable medium may include further operations, features, means, or instructions for performing an error check on the first DCI message using a scrambling sequence associated with the RNTI, where a successful error check using the scrambling sequence associated with the RNTI indicates that the first DCI message may be an activation DCI message for the one or more SRS resource sets.

In some examples of the method, apparatuses, and non-transitory computer-readable medium described herein, receiving the first DCI message indicating the activation of the one or more SRS resource sets may include operations, features, means, or instructions for receiving, in the one or more fields of the first DCI message, a set of bits that may be set to the set of multiple specific values.

In some examples of the method, apparatuses, and non-transitory computer-readable medium described herein, receiving the first DCI message indicating the activation of the one or more SRS resource sets may include operations, features, means, or instructions for receiving, in the first DCI message, an indication of an update for one or more parameters associated with the one or more SRS resource sets, where transmitting the SRS during each of the set of multiple periodic occasions associated with the one or more SRS resource sets may be based on receiving the indication of the update for the one or more parameters.

In some examples of the method, apparatuses, and non-transitory computer-readable medium described herein, the control signaling indicates a value for each of the one or more parameters and the method, apparatuses, and non-transitory computer-readable medium may include further operations, features, means, or instructions for updating the value stored at the UE for each of the one or more parameters based on the indication of the update for the one or more parameters in the first DCI message, where transmitting the SRS during each of the set of multiple periodic occasions associated with the one or more SRS resource sets may be based on updating the value for each of the one or more parameters.

In some examples of the method, apparatuses, and non-transitory computer-readable medium described herein, the first DCI message indicates the update for the one or more parameters in accordance with explicitly indicating a value for each of the one or more parameters.

In some examples of the method, apparatuses, and non-transitory computer-readable medium described herein, the control signaling indicates a correspondence between a set of configuration profiles and a set of parameter updates and the first DCI message indicates the update for the one or more parameters in accordance with indicating a configuration profile of the set of configuration profiles.

Some examples of the method, apparatuses, and non-transitory computer-readable medium described herein may further include operations, features, means, or instructions for receiving a second DCI message indicating an activation of at least one SRS resource set of the one or more SRS resource sets and discarding the second DCI message in accordance with the second DCI message indicating the activation of the at least one SRS resource set, where receiving the second DCI message indicating the activation of the at least one SRS resource set of the one or more SRS resource sets may be associated with an error case.

Some examples of the method, apparatuses, and non-transitory computer-readable medium described herein may further include operations, features, means, or instructions for receiving a second DCI message indicating an activation of at least one SRS resource set of the one or more SRS resource sets, where the second DCI message includes an indication of an update for one or more parameters associated with the at least one SRS resource set and updating a value of the one or more parameters associated with the at least one SRS resource set based on the indication of the update for the one or more parameters and in accordance with the second DCI message indicating the activation of the at least one SRS resource set.

In some examples of the method, apparatuses, and non-transitory computer-readable medium described herein, the control signaling indicates a defined slot number, and indicates that occasions of the one or more SRS resource sets may be defined relative to the defined slot number, and where transmitting the SRS during each of the set of multiple periodic occasions associated with the one or more SRS resource sets may include operations, features, means, or instructions for transmitting a first SRS in a first occasion of the one or more SRS resource sets after a time gap associated with a processing capability of the UE and an additional offset relative to a slot in which the first DCI message may be received.

Some examples of the method, apparatuses, and non-transitory computer-readable medium described herein may further include operations, features, means, or instructions for transmitting, to a network entity, an indication of the time gap associated with the processing capability of the UE.

In some examples of the method, apparatuses, and non-transitory computer-readable medium described herein, transmitting the SRS during each of the set of multiple periodic occasions associated with the one or more SRS resource sets may include operations, features, means, or instructions for transmitting a first SRS in a first occasion of the one or more SRS resource sets after an offset value relative to the slot in which the first DCI message may be received.

In some examples of the method, apparatuses, and non-transitory computer-readable medium described herein, the offset value may be received via at least one of the control signaling or the first DCI message.

Some examples of the method, apparatuses, and non-transitory computer-readable medium described herein may further include operations, features, means, or instructions for receiving a second DCI message indicating a deactivation of the one or more SRS resource sets, where the second DCI message indicates the deactivation of the one or more SRS resource sets based on at least one of being scrambled in accordance with an RNTI associated with deactivation DCI messages for SRS resource sets having the resource type of semi-persistent or one or more fields of the second DCI message having a set of multiple specific values.

A method for wireless communication at a network entity is described. The method may include outputting control signaling indicating a resource type of a set of SRS resource sets as semi-persistent and indicating that the set of SRS resource sets are associated with DCI activation, outputting a first DCI message indicating an activation of one or more SRS resource sets of the set of SRS resource sets, and obtaining an SRS during each of a set of multiple periodic occasions associated with the one or more SRS resource sets based on the DCI activation of the one or more SRS resource sets and in accordance with the resource type of the one or more SRS resource sets being semi-persistent.

An apparatus for wireless communication at a network entity is described. The apparatus may include a processor, memory coupled with the processor, and instructions stored in the memory. The instructions may be executable by the processor to cause the apparatus to output control signaling indicating a resource type of a set of SRS resource sets as semi-persistent and indicating that the set of SRS resource sets are associated with DCI activation, output a first DCI message indicating an activation of one or more SRS resource sets of the set of SRS resource sets, and obtain an SRS during each of a set of multiple periodic occasions associated with the one or more SRS resource sets based on the DCI activation of the one or more SRS resource sets and in accordance with the resource type of the one or more SRS resource sets being semi-persistent.

Another apparatus for wireless communication at a network entity is described. The apparatus may include means for outputting control signaling indicating a resource type of a set of SRS resource sets as semi-persistent and indicating that the set of SRS resource sets are associated with DCI activation, means for outputting a first DCI message indicating an activation of one or more SRS resource sets of the set of SRS resource sets, and means for obtaining an SRS during each of a set of multiple periodic occasions associated with the one or more SRS resource sets based on the DCI activation of the one or more SRS resource sets and in accordance with the resource type of the one or more SRS resource sets being semi-persistent.

A non-transitory computer-readable medium storing code for wireless communication at a network entity is described. The code may include instructions executable by a processor to output control signaling indicating a resource type of a set of SRS resource sets as semi-persistent and indicating that the set of SRS resource sets are associated with DCI activation, output a first DCI message indicating an activation of one or more SRS resource sets of the set of SRS resource sets, and obtain an SRS during each of a set of multiple periodic occasions associated with the one or more SRS resource sets based on the DCI activation of the one or more SRS resource sets and in accordance with the resource type of the one or more SRS resource sets being semi-persistent.

In some examples of the method, apparatuses, and non-transitory computer-readable medium described herein, outputting the first DCI message indicating the activation of the one or more SRS resource sets may include operations, features, means, or instructions for outputting, in the first DCI message, a codepoint of the set of multiple codepoints corresponding to the one or more SRS resource sets in accordance with the mapping.

In some examples of the method, apparatuses, and non-transitory computer-readable medium described herein, the control signaling indicates an RNTI associated with a scrambling of activation DCI messages for SRS resource sets having the resource type of semi-persistent and the method, apparatuses, and non-transitory computer-readable medium may include further operations, features, means, or instructions for scrambling the first DCI message using a scrambling sequence associated with the RNTI in accordance with the first DCI message being an activation DCI message for the one or more SRS resource sets.

In some examples of the method, apparatuses, and non-transitory computer-readable medium described herein, outputting the first DCI message indicating the activation of the one or more SRS resource sets may include operations, features, means, or instructions for outputting, in the one or more fields of the first DCI message, a set of bits that may be set to the set of multiple specific values.

In some examples of the method, apparatuses, and non-transitory computer-readable medium described herein, outputting the first DCI message indicating the activation of the one or more SRS resource sets may include operations, features, means, or instructions for outputting, in the first DCI message, an indication of an update for one or more parameters associated with the one or more SRS resource sets, where obtaining the SRS during each of the set of multiple periodic occasions associated with the one or more SRS resource sets may be based on transmitting the indication of the update for the one or more parameters.

In some examples of the method, apparatuses, and non-transitory computer-readable medium described herein, the control signaling indicates a value for each of the one or more parameters and the method, apparatuses, and non-transitory computer-readable medium may include further operations, features, means, or instructions for updating the value stored at the network entity for each of the one or more parameters based on the indication of the update for the one or more parameters in the first DCI message, where obtaining the SRS during each of the set of multiple periodic occasions associated with the one or more SRS resource sets may be based on updating the value for each of the one or more parameters.

In some examples of the method, apparatuses, and non-transitory computer-readable medium described herein, the first DCI message indicates the update for the one or more parameters in accordance with explicitly indicating a value for each of the one or more parameters.

In some examples of the method, apparatuses, and non-transitory computer-readable medium described herein, the control signaling indicates a correspondence between a set of configuration profiles and a set of parameter updates and the first DCI message indicates the update for the one or more parameters in accordance with indicating a configuration profile of the set of configuration profiles.

Some examples of the method, apparatuses, and non-transitory computer-readable medium described herein may further include operations, features, means, or instructions for generating a second DCI message indicating an activation of at least one SRS resource set of the one or more SRS resource sets and discarding the second DCI message in accordance with the second DCI message indicating the activation of the at least one SRS resource set, where generating the second DCI message indicating the activation of the at least one SRS resource set of the one or more SRS resource sets may be associated with an error case.

Some examples of the method, apparatuses, and non-transitory computer-readable medium described herein may further include operations, features, means, or instructions for outputting a second DCI message indicating an activation of at least one SRS resource set of the one or more SRS resource sets, where the second DCI message includes an indication of an update for one or more parameters associated with the at least one SRS resource set and updating a value of the one or more parameters associated with the at least one SRS resource set based on the indication of the update for the one or more parameters and in accordance with the second DCI message indicating the activation of the at least one SRS resource set.

In some examples of the method, apparatuses, and non-transitory computer-readable medium described herein, the control signaling indicates a defined slot number, and indicates that occasions of the one or more SRS resource sets may be defined relative to the defined slot number, and where obtaining the SRS during each of the set of multiple periodic occasions associated with the one or more SRS resource sets may include operations, features, means, or instructions for obtaining a first SRS in a first occasion of the one or more SRS resource sets after a time gap associated with a processing capability of a UE and an additional offset relative to a slot in which the first DCI message may be output.

Some examples of the method, apparatuses, and non-transitory computer-readable medium described herein may further include operations, features, means, or instructions for obtaining an indication of the time gap associated with the processing capability of the UE.

In some examples of the method, apparatuses, and non-transitory computer-readable medium described herein, obtaining the SRS during each of the set of multiple periodic occasions associated with the one or more SRS resource sets may include operations, features, means, or instructions for obtaining a first SRS in a first occasion of the one or more SRS resource sets after an offset value relative to the slot in which the first DCI message may be output.

In some examples of the method, apparatuses, and non-transitory computer-readable medium described herein, the offset value may be received via at least one of the control signaling or the first DCI message.

Some examples of the method, apparatuses, and non-transitory computer-readable medium described herein may further include operations, features, means, or instructions for outputting a second DCI message indicating a deactivation of the one or more SRS resource sets, where the second DCI message indicates the deactivation of the one or more SRS resource sets based on at least one of being scrambled in accordance with an RNTI associated with deactivation DCI messages for SRS resource sets having the resource type of semi-persistent or one or more fields of the second DCI message having a set of multiple specific values.

DETAILED DESCRIPTION

Figure 1:
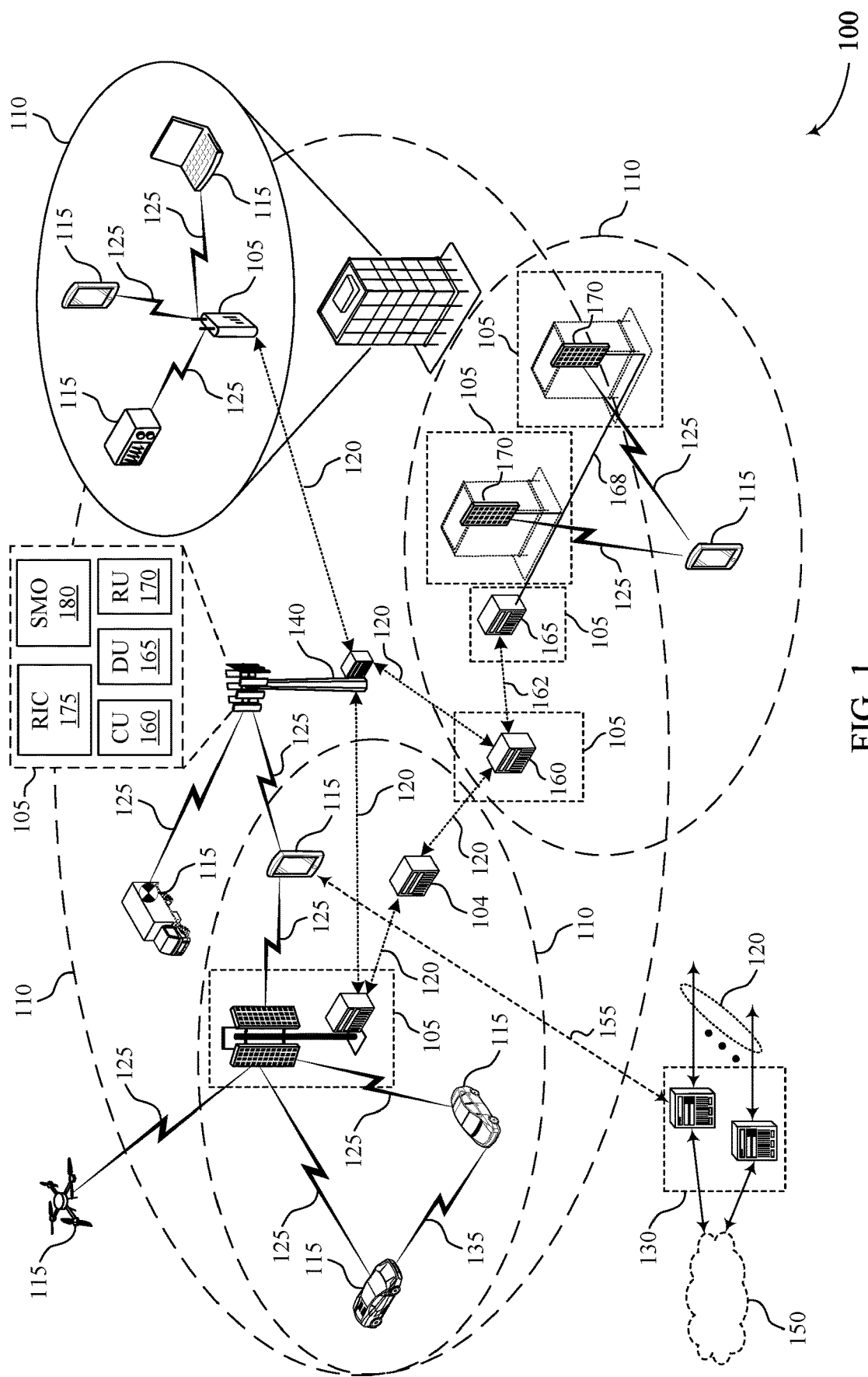
FIGS. 1 and 2 show examples of wireless communications systems that supports downlink control information (DCI) activation for semi-persistent sounding reference signal (SRS) resource sets in accordance with one or more aspects of the present disclosure.

In some wireless communications systems, a network entity may configure time or frequency resources that a user equipment (UE) may use for transmitting a sounding reference signal (SRS) using one or more SRS resources within an SRS resource set. The network entity may configure a resource type of an SRS resource set as aperiodic, semi-persistent, or periodic and the SRS resource set may be associated with a specific activation mechanism depending on whether the resource type is configured as aperiodic, semi-persistent, or periodic. Some activation mechanisms, however, may introduce relatively high latency and may be inefficient in terms of configurability or flexibility associated with an activated SRS resource set. For example, an activation mechanism for a semi-persistent SRS resource set may involve a transmission and reception of one or more medium access control (MAC) control elements (MAC-CEs), which may be associated with relatively high latency as compared to some other signaling types and which may be unable to support dynamic updates for configured parameters. In some cases, for example, a network entity may transmit a MAC-CE to a UE relatively more infrequently or in accordance with a relatively stricter or less flexible schedule as compared to some other signaling types, which may result in such relatively high latency and inability to support dynamic updates. Such a high latency and lack of support for dynamic updates may hinder performance in some deployment scenarios, such as in deployment scenarios associated with rapidly changing channel conditions or a high susceptibility to SRS transmission-based interference.

In some implementations of the present disclosure, a UE and a network entity may support one or more signaling- or configuration-based mechanisms according to which the UE and the network entity may dynamically control a type of semi-persistent SRS resource set associated with activation and deactivation by downlink control information (DCI). For example, the network entity may transmit an indication of a set of semi-persistent SRS resource sets associated with DCI activation to the UE via radio resource control (RRC) signaling and may activate one or more semi-persistent SRS resource sets from the set of semi-persistent SRS resource sets via a DCI message. In accordance with supporting a type of semi-persistent SRS resource set associated with DCI activation and deactivation, a network entity may activate or deactivate a semi-persistent SRS resource set with relatively lower latency and more dynamically (as compared to other activation mechanisms, such as those discussed above and in more detail throughout the application, including activation mechanisms based on MAC-CE transmission and reception), which may facilitate greater adaptability to changing channel conditions and more effective interference avoidance. In other words, the UE and the network entity may establish a capability for greater adaptability in accordance with control signaling (e.g., RRC signaling) that indicates a resource type of a set of SRS resource sets as semi-persistent and indicates that the set of SRS resource sets are associated with DCI activation. The UE and the network entity may realize or achieve that greater adaptability in accordance with a DCI message that indicates an activation of one or more SRS resource sets of the set of SRS resource sets and transmission and reception of SRSs during each of multiple periodic occasions associated with the one or more SRS resource sets. Such lower latency and greater adaptability may further support higher data rates, greater system capacity, and greater spectral efficiency, among other benefits.

Further, to facilitate activation by DCI, the UE and the network entity may support a mapping (e.g., an RRC configured mapping) between a set of DCI codepoints and multiple sets of one or more semi-persistent SRS resource sets such that each DCI codepoint corresponds to (and indicates an activation for) a unique set of one or more semi-persistent SRS resource sets. In some examples, the network entity may use the activating DCI message or another DCI message to indicate an update for one or more parameters (e.g., one or more RRC configured parameters) associated with an activated semi-persistent SRS resource set and the UE may update the one or more parameters associated with the activated semi-persistent SRS resource set accordingly.

Such implementations of the subject matter described in this disclosure also can be implemented to realize one or more of the following potential advantages. For example, in accordance with supporting a configured mapping between DCI codepoints and multiple sets of one or more semi-persistent SRS resource sets, the UE and the network entity may reduce or eliminate activation or deactivation ambiguity while maintaining the relatively lower latency provided by DCI activation and deactivation. Moreover, in scenarios in which the network entity dynamically updates one or more parameters via a DCI message (e.g., the DCI message activating the semi-persistent SRS resource set or another DCI message), the UE and the network entity may have greater flexibility (as compared to an activation mechanism for semi-persistent SRS resource sets based on MAC-CE transmission and reception) in how the UE transmits an SRS over resources of the semi-persistent SRS resource set. For example, an activation mechanism for semi-persistent SRS resource sets based on MAC-CE transmission and reception may be unable to provide parameter updates (and the corresponding flexibility) due to the stricter or less flexible transmission schedule of a MAC-CE. Such flexibility for parameter updates may be beneficial in various deployment scenarios, including in multi-transmission and reception point (TRP) scenarios in which the UE may transmit SRSs toward multiple TRPs. Such lower latency, reduced ambiguity, and dynamic parameter updates may further support higher data rates, greater system capacity, and greater spectral efficiency, among other benefits.

Aspects of the disclosure are initially described in the context of wireless communications systems. Aspects of the disclosure are additionally illustrated by and described with reference to communication timelines, a control element, and a process flow. Aspects of the disclosure are further illustrated by and described with reference to apparatus diagrams, system diagrams, and flowcharts that relate to DCI activation for semi-persistent SRS resource sets.

FIG. 1 shows an example of a wireless communications system 100 that supports DCI activation for semi-persistent SRS resource sets in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support downlink control information activation for semi-persistent sounding reference signal resource sets as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

In the wireless communications system 100, a network entity 105 may configure time or frequency resources that a UE 115 may use for transmitting an SRS using one or more SRS resources within an SRS resource set. The network entity 105 may configure a resource type of an SRS resource set as aperiodic, semi-persistent, or periodic and the SRS resource set may be associated with a specific or unique activation mechanism depending on whether the resource type is configured as aperiodic, semi-persistent, or periodic. Some activation mechanisms, however, may introduce relatively high latency and may be inefficient in terms of configurability or flexibility associated with an SRS resource set. For example, an activation mechanism for a semi-persistent SRS resource set may be associated with relatively high latency signaling and may be unable to support dynamic updates for configured parameters. Such a high latency and lack of support for dynamic updates for configured parameters may hinder performance in some deployment scenarios, such as in deployment scenarios associated with rapidly changing channel conditions or a high susceptibility to SRS transmission-based interference.

In some implementations, a UE 115 and a network entity 105 may support one or more signaling- or configuration-based mechanisms according to which the UE 115 and the network entity 105 may dynamically activate and update a type of semi-persistent SRS resource set associated with activation and deactivation by DCI. For example, the network entity 105 may transmit an indication of a set of semi-persistent SRS resource sets associated with DCI activation to the UE 115 via RRC signaling and may activate one or more semi-persistent SRS resource sets from the set of semi-persistent SRS resource sets via a DCI message. To facilitate activation by DCI, the UE 115 and the network entity 105 may support a mapping between a set of DCI codepoints and multiple sets of one or more semi-persistent SRS resource sets such that each DCI codepoint corresponds to (and indicates an activation for) a unique set of one or more semi-persistent SRS resource sets. In some examples, the network entity 105 may use the activating DCI message or another DCI message to indicate an update for one or more parameters or resources (e.g., one or more RRC configured parameters or resources) associated with an activated semi-persistent SRS resource set and the UE 115 may update the one or more parameters or resources associated with the activated semi-persistent SRS resource set accordingly.

Figure 2:
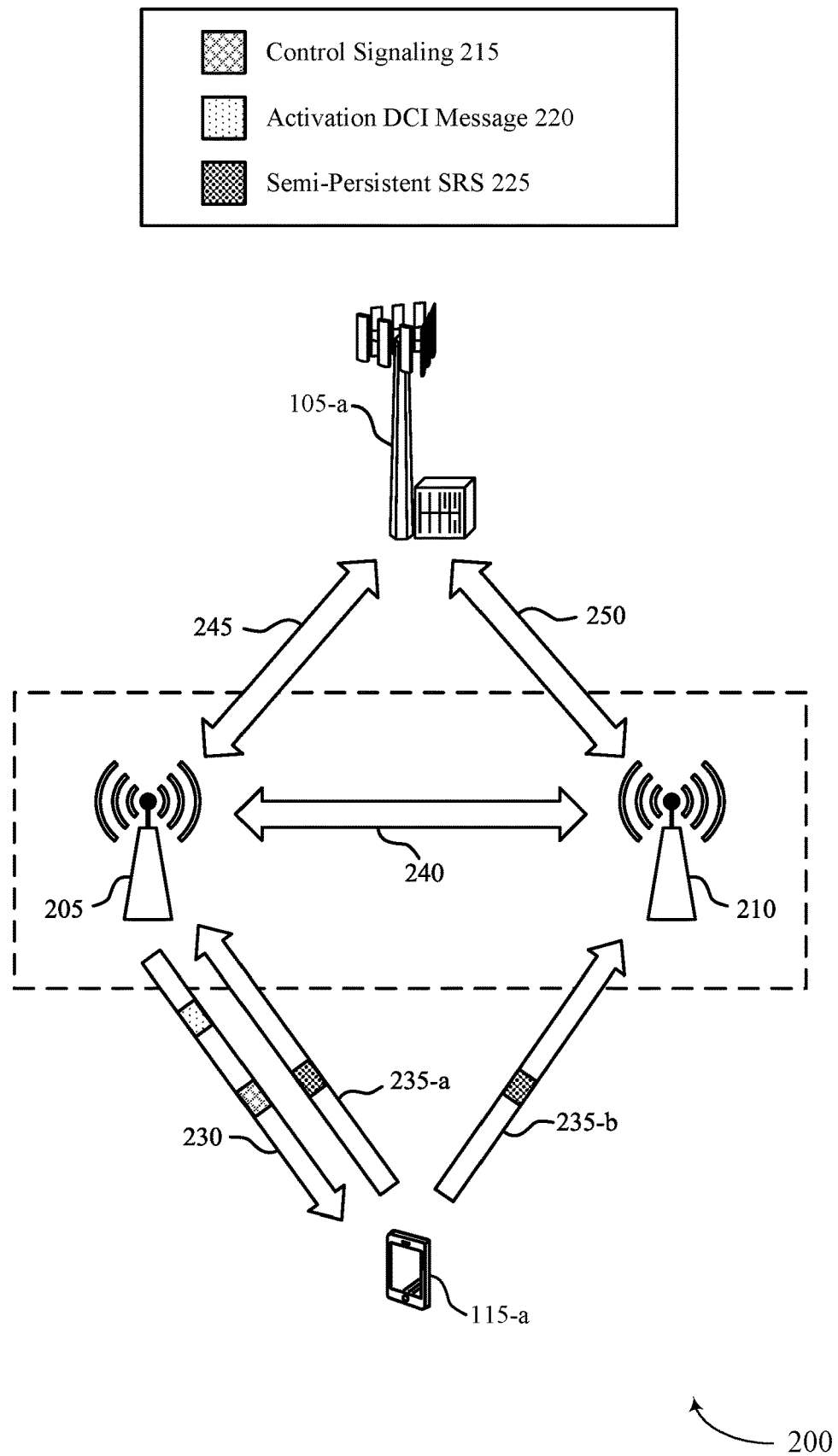

FIG. 2 shows an example of a wireless communications system 200 that supports DCI activation for semi-persistent SRS resource sets in accordance with one or more aspects of the present disclosure. The wireless communications system 200 may implement or be implemented to realize aspects of the wireless communications system 100. For example, the wireless communications system 200 may illustrate communication between a UE 115-*a* and a network entity 105-*a* via a TRP 205 and a TRP 210. The UE 115-*a*, the network entity 105-*a*, the TRP 205, and the TRP 210 may be examples of corresponding devices illustrated by and described with reference to FIG. 1. In some examples, the UE 115-*a*, the network entity 105-*a*, the TRP 205, and the TRP 210 may support one or more types of SRS resource sets and the UE 115-*a* may transmit an SRS to one or both of the TRP 205 or the TRP 210 using resources of one or more of the various types of SRS resource sets.

For example, SRS resources may be configured within an SRS resource set including one or more SRS resources. In other words, the network entity 105-*a*, directly or via one or both of the TRP 205 or the TRP 210, may configure the UE 115-*a* with an SRS resource set including or otherwise associated with one or more SRS resources over which the UE 115-*a* may transmit an SRS (if the SRS resource set is activated). In some aspects, such a configuration mechanism may simplify activation (e.g., for a semi-persistent SRS resource set) or DCI triggering (e.g., for an aperiodic SRS resource set) as multiple SRS resources or multiple SRS resource sets may be activated or triggered simultaneously.

The network entity 105-*a* may configure a resource type (e.g., via a resource Type parameter) for an SRS resource set as aperiodic, semi-persistent, or periodic. For example, an RRC configuration per SRS resource set may configure or indicate a resource Type parameter as aperiodic, semi-persistent, or periodic. The network entity 105-*a* and the UE 115-*a* may use different signaling mechanisms to activate or trigger SRS resource sets associated with different resource types. For example, the network entity 105-*a* and the UE 115-*a* may use a first signaling mechanism to activate or trigger an aperiodic SRS resource set, may use a second signaling mechanism to activate or trigger a periodic SRS resource set, and may use a third signaling mechanism to activate or trigger a semi-persistent SRS resource set.

The network entity 105-*a* may trigger an aperiodic SRS resource set (which may be equivalently referred to as an AP SRS resource set) with a downlink DCI (e.g., a downlink DCI format 1_1 or 1_2) or a group-common DCI (e.g., a DCI format 2_3). Additionally, or alternatively, the UE 115-*a* may trigger, or request the network entity 105-*a* to trigger, an aperiodic SRS resource with an uplink DCI (e.g., an uplink DCI format 0_1 or 0_2) or a group-common DCI (e.g., a DCI format 2_3). In some implementations, an SRS request field of a triggering DCI may indicate one or more aperiodic SRS resource sets and the UE 115-*a* and the network entity 105-*a* may support a mapping between SRS resource sets and SRS request codepoints. For example, the mapping may indicate a correspondence between codepoints of "01," "10," and "11" and different sets of one or more aperiodic SRS resource sets, as illustrated by Table 1 below. In some aspects, the network entity 105-*a* may indicate the mapping to the UE 115-*a* by a configuration (e.g., an RRC configuration, such as via an aperiodicSRS-Resource Trigger parameter or an aperiodicSRS-ResourceTriggerList parameter).

TABLE 1

Mapping between codepoints and sets of one or more SRS resource sets

| Codepoint (Value of SRS Request Field) | Triggered Aperiodic SRS Resource Set(s) |
| --- | --- |
| 00 | No aperiodic SRS resource set triggered |
| 01 | SRS resource set(s) configured with higher layer parameter aperiodicSRS-ResourceTrigger set to 1 or an entry in aperiodicSRS-ResourceTriggerList set to 1 |
| 10 | SRS resource set(s) configured with higher layer parameter aperiodicSRS-ResourceTrigger set to 2 or an entry in aperiodicSRS-ResourceTriggerList set to 2 |
| 11 | SRS resource set(s) configured with higher layer parameter aperiodicSRS-ResourceTrigger set to 3 or an entry in aperiodicSRS-ResourceTriggerList set to 3 |

Additionally, or alternatively, a one-time transmission of an SRS (from an aperiodic, not periodic, SRS resource set) may be based on a slot offset. In other words, an aperiodic SRS resource set may be triggered by a slot offset. For example, the network entity 105-a may configure a slot offset per aperiodic SRS resource set via control signaling 215 (e.g., RRC signaling, such that slot offset may be configured per SRS resource set) and the UE 115-a or the network entity 105-a may include or add one or more slot offset indicator fields to DCI. Such an inclusion of one or more slot offset indicator fields may support a more flexible or dynamic indication of slot offset and function as a dynamic trigger for a corresponding SRS resource set (e.g., an SRS resource set for which the slot offset is configured or mapped to via the RRC signaling).

The network entity 105-a may configure (and activate) a periodic SRS resource set (which may be equivalently referred to as a P SRS resource set) by control signaling 215 (e.g., RRC signaling). Once configured, the UE 115-a may transmit an SRS using SRS resources within the periodic SRS resource set periodically. For example, the network entity may indicate or configure (e.g., via RRC signaling) a set of parameters (e.g., RRC parameters) associated with the periodic SRS resource set and the set of parameters may include a periodicity parameter and an offset parameter. As such, the UE 115-a may transmit an SRS using SRS resources within the periodic SRS resource set based on the periodicity and offset RRC parameters.

Some activation signaling mechanisms for a semi-persistent SRS resource set (which may be equivalently referred to as an SP SRS resource set) may have high latency. For example, some activation signaling mechanisms for a semi-persistent SRS resource set may rely on a signaling type associated with relatively higher latency, such as a MAC-CE, as compared to other signaling types (such as DCI). The network entity 105-a and the UE 115-a may use a DCI-based activation design for various other cases in some deployments (e.g., in NR), such as for SPS physical downlink shared channel (PDSCH) transmissions, configured grant (CG) physical uplink shared channel (PUSCH) transmissions, semi-persistent CSI reporting on a PUSCH. Semi-persistent SRS resource sets, however, may lack such a DCI-based activation design or functionality.

Further, and based on such a reliance on a signaling type associated with relatively higher latency and in view of a messaging content of such a signaling type, the network entity 105-a and the UE 115-a may be unable to adapt a set of parameters associated with a semi-persistent SRS resource set to changing channel conditions or changing deployment constraints or considerations. For example, some signaling mechanisms that support semi-persistent SRS resource sets may lack adaptability or flexibility to changing channel conditions or changing deployment constraints or considerations, which may be useful in some deployment scenarios.

In multi-TRP deployments, for example, an SRS transmission from one UE 115 (e.g., the UE 115-a) may be received by multiple TRPs (e.g., the TRP 205 and the TRP 210) and the multiple TRPs may use the SRS transmission to acquire a downlink channel for coherent joint transmission. In such multi-TRP deployments, a relatively more dynamic indication of SRS triggering and SRS parameters may facilitate more accurate downlink channel estimation depending on multi-user (MU) pairing on downlink and on scheduling decisions between multiple users and the multiple TRPs. Otherwise, if a relatively less dynamic indication of SRS triggering and SRS parameters is relied upon, a set of (e.g., multiple) UEs 115 may transmit SRS simultaneously (and each SRS transmission may be targeted toward multiple TRPs) and the network entity 105-a may be unable to manage any resulting interference properly.

To allow for or support more flexibility for SRS triggering or activating with a relatively small latency, the UE 115-a and the network entity 105-a may support a DCI-based trigger or activation (e.g., as opposed to triggering or activation by a MAC-CE or RRC signaling). The UE 115-a and the network entity 105-a may leverage such a DCI-based trigger for aperiodic SRS triggering, but, for each instance of SRS transmission, the network entity 105-a may transmit one DCI to trigger the transmission (e.g., the trigger is a one-time request by DCI). Such a one-to-one correspondence between DCI trigger and SRS transmission may be associated with or otherwise lead to DCI overhead. The DCI overhead for aperiodic SRS transmission may become prohibitively large in scenarios in which the network entity 105-a requests frequent SRS transmissions from the UE 115-a. As such, the UE 115-a and the network entity 105-a may achieve greater spectral efficiency and lower overhead if the network entity 105-a is able to request the UE 115-a to transmit an SRS periodically once triggered or activated by DCI and until another DCI releases or deactivates the transmission of the SRS.

Accordingly, in some implementations, the UE 115-a and the network entity 105-a may support a semi-persistent SRS resource set based on DCI activation and DCI release, where periodic SRS transmission is activated by a DCI and the periodic SRS transmission continues until another DCI releases the semi-persistent SRS resource set. Such a DCI-based activation may reduce DCI overhead and reduce latency as compared to other signaling mechanisms associated with activating a semi-persistent SRS resource set and, in addition, may allow for or support a dynamic updating of one or more parameters of a semi-persistent SRS transmission by sending another DCI triggering a same semi-persistent SRS resource set (e.g., a semi-persistent SRS resource set that is already activated by a previous DCI) with a different set of parameters. Such a DCI may be referred to herein as a reactivation DCI.

In accordance with the techniques described herein, the network entity 105-a may transmit control signaling 215 (e.g., RRC signaling) to the UE 115-a indicating resource type of a set of SRS resource sets as semi-persistent and indicating that the set of semi-persistent SRS resource sets are associated with DCI activation. For example, the network entity 105-a may configure a type of semi-persistent SRS resource sets that is associated with DCI-based activation and release for lower latency and reduced DCI overhead. As such, the network entity 105-a may define, indicate, or configure a type of semi-persistent SRS associated with DCI activation and release per SRS resource set.

The network entity 105-a may transmit an activation DCI message 220 to the UE 115-a to activate one or more of the set of semi-persistent SRS resource sets over which the UE 115-a may transmit a semi-persistent SRS 225. The UE 115-a may receive the activation DCI 220 from the network entity 105-a directly or via the TRP 205 on a downlink 230. Upon reception of the activation DCI message 220, the UE 115-a may transmit a semi-persistent SRS 225 over each of multiple periodic resources or occasions associated with the one or more activated semi-persistent SRS resource sets until the one or more semi-persistent SRS resource sets are released or deactivated (e.g., by another DCI). For example, once a semi-persistent SRS resource set is activated by the activation DCI message 220, the UE 115-a may transmit a semi-persistent SRS 225 using the SRS resources within the activated semi-persistent SRS resource set periodically (e.g., based on a configured, such as RRC configured, periodicity) until another DCI releases the semi-persistent SRS resource set. In some implementations, the UE 115-a may transmit a semi-persistent SRS 225 to the TRP 205 on an uplink 235-a and to the TRP 210 on an uplink 235-b.

The UE 115-a and the network entity may additionally support one or more signaling- or configuration-based mechanisms for supporting various other aspects that may facilitate or improve DCI-based activation for semi-persistent SRS resources. For example, the UE 115-a and the network entity 105-a may support one or more signaling- or configuration-based mechanisms according to which the UE 115-a is able to identify a DCI for activation or for release and able to distinguish such a DCI for activation or release from other semi-persistent SRS triggering mechanisms. Additionally, or alternatively, the UE 115-a and the network entity 105-a may support one or more signaling- or configuration-based mechanisms according to which the UE 115-a and the network entity 105-a may leverage DCI-based activation for updating one or more parameters (e.g., in addition to activation). Additional details relating to such an identification of a DCI for activation or release of a semi-persistent SRS resource set and such a parameter update for semi-persistent SRS resource sets associated with DCI activation are described with reference to FIG. 3. Further, the UE 115-a and the network entity 105-a may support one or more signaling- or configuration-based mechanisms according to which the UE 115-a and the network entity 105-a may determine, identify, or otherwise ascertain a first instance or occasion of SRS transmission after activation, as illustrated by and described in more detail with reference to FIGS. 4 and 5.

Further, although illustrated by the wireless communications system 200 in a context of a multi-TRP deployment involving the TRP 205 and the TRP 210, the UE 115-a may additionally, or alternatively, transmit a semi-persistent SRS 225 to the network entity 105-a directly. In the multi-TRP deployment involving the TRP 205 and the TRP 210, the TRP 205 and the TRP 210 may be collocated with the network entity 105-a (e.g., located at a same geographic location) or may be located at different locations than the network entity 105-a, or any combination thereof. The TRP 205 and the TRP 210 may communicate via a link 240 (which may be an example of a sidelink or a backhaul link), the TRP 205 and the network entity 105-a may communicate via a link 245 (which may be an example of an access link or a backhaul link), and the TRP 210 and the network entity 105-a may communicate via a link 250 (which may be an example of an access link or a backhaul link).

Figure 3:
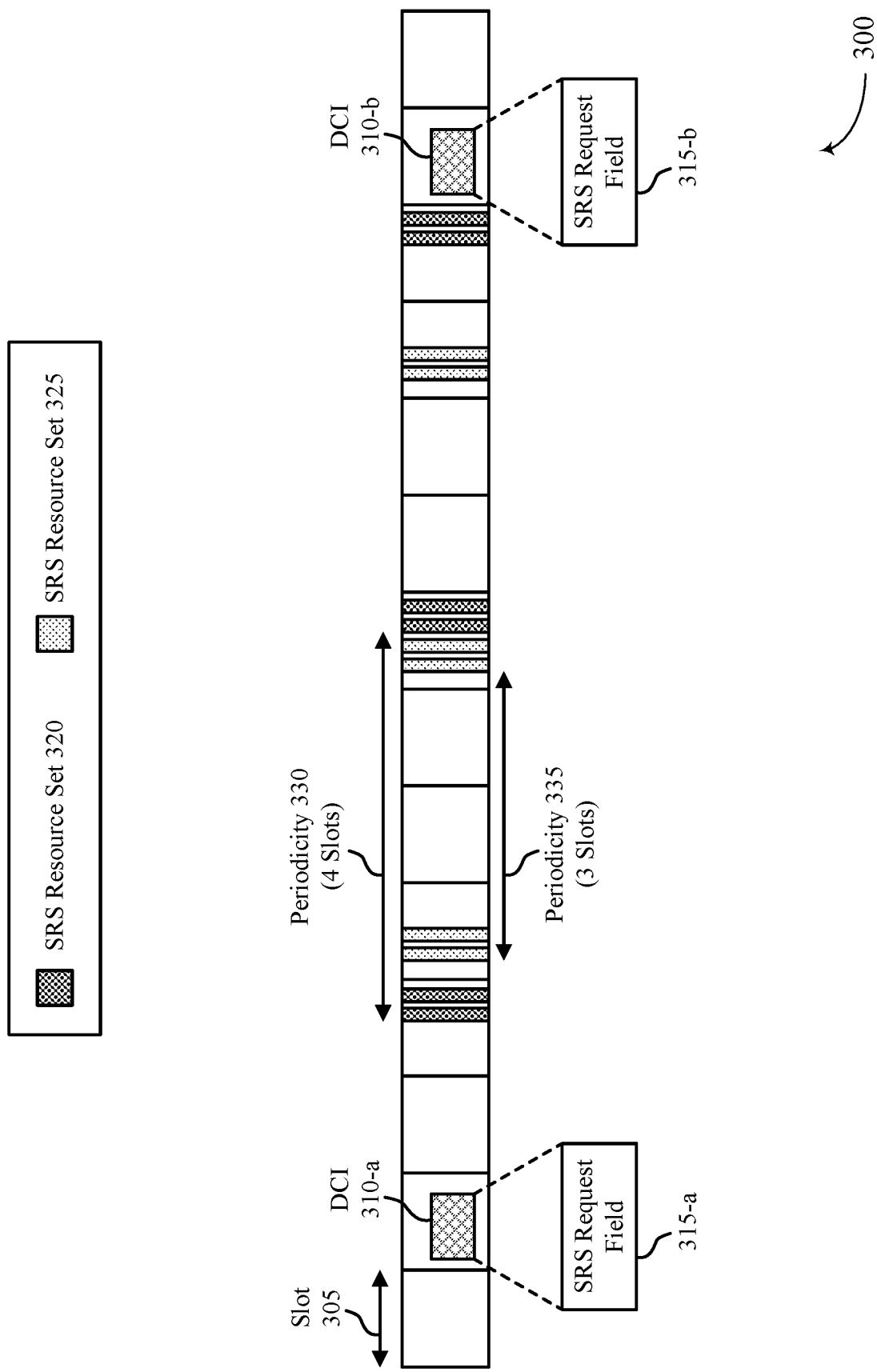
FIGS. 3 through 5 show examples of communication timelines that support DCI activation for semi-persistent SRS resource sets in accordance with one or more aspects of the present disclosure.

FIG. 3 shows an example of a communication timeline 300 that supports DCI activation for semi-persistent SRS resource sets in accordance with one or more aspects of the present disclosure. The communication timeline 300 may implement or be implemented to realize aspects of the wireless communications system 100 or the wireless communications system 200. For example, the communication timeline 300 may illustrate communication between a UE 115 and a network entity 105 across a number of slots 305. The UE 115 and the network entity 105 may be examples of UEs 115 or the UE 115-a and network entities 105 or the network entity 105-a, respectively, as illustrated by and described with reference to FIGS. 1 and 2. In some implementations, the UE 115 and the network entity 105 may support DCI activation for one or more semi-persistent SRS resource sets.

For example, the network entity 105 may transmit a DCI 310-a to the UE 115 indicating an activation for one or more semi-persistent SRS resource sets via an SRS request field 315-a. The DCI 310-a may be an example of a DCI format 0_1, a DCI format 0_2, a DCI format 1_1, a DCI format 1_2, or any combination thereof and the network entity 105 may use the SRS request field 315-a in the DCI 310-a to activate an SRS resource set 320 and an SRS resource set 325. In some implementations, the network entity 105 may include a codepoint in the SRS request field 315-a and may indicate an activation for the SRS resource set 320 and the SRS resource set 325 via the codepoint. For example, one codepoint of the SRS request field 315-a may be mapped to one or multiple SRS resource sets. The network entity 105 may signal or configure the mapping between codepoints and sets of one or multiple SRS resource to the UE 115 via control signaling (e.g., RRC signaling). As such, the mapping may be RRC configured per SRS resource set by configuring a trigger list, which may refer to a set of different activating or triggering codepoints, per SRS resource set (if that SRS resource set is configured with a resource type of semi-persistent SRS associated with DCI activation).

An example mapping between codepoints and SRS resource sets is illustrated by Table 2 below. In the example mapping illustrated by Table 2, SRS resource sets A, B, C, and D may be configured with "SP-SRS with DCI activation" and a trigger list (e.g., which sets of codepoints activate a given SRS resource set) may be defined in accordance with a correspondence between codepoints and numeric values (e.g., a codepoint of "00" may correspond to an entry of "0" in a trigger list, a codepoint of "01" may correspond to an entry of "1" in a trigger list, and so on). Accordingly, and as illustrated by Table 2, a trigger list for the SRS resource set A may be "0, 3," a trigger list for the SRS resource set B may be "0, 1, 3," a trigger list for the SRS resource set C may be "1," and a trigger list for the SRS resource set D may be "2, 3." Thus, unlike some semi-persistent SRS activation mechanisms, an SRS request field 315-a value of "00" may be used in a trigger list (e.g., can activate one or more SRS resource sets).

TABLE 2

Mapping between codepoints and sets
of one or more SRS resource sets

| Codepoint (Value of SRS Request Field) | Triggered Semi-Persistent SRS Resource Set(s) |
|---|---|
| 00 | A, B |
| 01 | B, C |
| 10 | D |
| 11 | A, B, D |

As such, in the example of the communication timeline 300, the network entity 105 may include a codepoint in the SRS request field 315-a corresponding to the SRS resource set 320 and the SRS resource set 325 based on the mapping. In an example, the network entity 105 may include a codepoint of "01" in the SRS request field 315-a (such that the SRS resource set 320 and the SRS resource set 325 may be examples of SRS resource sets B and C in the example of Table 2). The UE 115 may accordingly transmit an SRS over each of multiple periodic occasions or resources associated with the SRS resource set 320 and the SRS resource set 325. The SRS resource set 320 may be associated with a periodicity 330 of four slots (e.g., in accordance with an RRC configured periodicity) and the SRS resource set 325 may be associated with a periodicity 335 of three slots (e.g., in accordance with an RRC configured periodicity).

In some implementations, the UE 115 may validate a DCI (e.g., the DCI 310-a), for semi-persistent SRS activation or release, based on an error check of the DCI based on (e.g., assuming or expecting) a scrambling of the DCI with a specific radio network temporary identifier (RNTI). For example, the UE 115 may expect that the DCI 310-a is for activation or release of one or more semi-persistent SRS resource sets if the DCI 310-a is scrambled with an RNTI associated with activation DCI messages. Such an RNTI associated with activation DCI messages (or deactivation DCI messages) may be referred to herein as an "SP-SRS-RNTI" and the network entity 105 may indicate or configure the SP-SRS-RNTI at the UE via control signaling (e.g., via RRC signaling). As such, the UE 115 may perform an error check, such as a cyclic redundancy check (CRC), of the DCI 310-a and a success of the error check may depend on whether the DCI 310-a was scrambled by the network entity 105 using the SP-SRS-RNTI.

Additionally, or alternatively, some specific fields of the DCI 310-a may be set to reserved values for validation of the DCI 310-a as being a DCI for semi-persistent SRS activation or release (e.g., such as may similarly be performed for semi-persistent CSI reporting on a PUSCH). For example, to indicate that a DCI message is for semi-persistent SRS activation, the network entity 105 may set or configure a number of (e.g., all) bits in a hybrid automatic repeat request (HARD) process number field to be equal to zero values and may set or configure a number of (e.g., all) bits in a redundancy version (RV) field to be equal to zero values. To indicate that a DCI message is for semi-persistent SRS release, the network entity 105 may set or configure a number of (e.g., all) bits in a HARQ process number field to be equal to zero values, may set or configure a number of (e.g., all) bits in an RV field to be equal to zero values, may set a number of (e.g., all) bits in a modulation and coding scheme (MCS) field to one values, and may set a number of (e.g., all) bits in a frequency domain resource assignment (FDRA) field to either zero values or one values depending on a resource allocation type for the relevant one or more SRS resource sets. Such bit values to indicate a DCI as being a DCI for semi-persistent SRS activation are illustrated by Table 3 and such bit values to indicate a DCI as being a DCI for semi-persistent SRS release are illustrated by Table 4. In some aspects, Tables 3 and 4 may apply for DCI formats 0_1 or 0_2.

TABLE 3

Bit Values for Semi-Persistent SRS Resource Set Activation DCI

| DCI Field | DCI Field Bit Values |
|---|---|
| HARQ Process Number | Set to all '0's |
| Redundancy Version | Set to all '0's |

TABLE 4

Bit Values for Semi-Persistent SRS Resource
Set Deactivation or Release DCI

| DCI Field | DCI Field Bit Values |
|---|---|
| HARQ Process Number | Set to all '0's |
| Modulation and Coding Scheme | Set to all '1's |
| Resource Block Assignment | Set to all '0's or all '1's |
| Redundancy Version | Set to all '0's |

For the resource block assignment field for indicating a semi-persistent SRS resource set release DCI of Table 4, the included bits may be set to zero values if a higher layer configures a resource assignment (RA) type 0 or may be set to one values if a higher layer configures an RA type 1. If a higher layer configures a dynamic switch between an RA type 0 and an RA type 1, and if a most significant bit (MSB) is set to a zero value, the bits included in the resource block assignment field may be set to zero values; otherwise, the bits included in the resource block assignment field may be set to one values. For DCI format 0_1, if a higher layer configures an RA type 2, the bits included in the resource block assignment field may be set to one values if a numerology $\mu=0$ or may be set to zero values if a numerology $\mu=1$.

Alternatively, for one or more of such DCI fields, different reserved values may be specified to differentiate activation versus release for semi-persistent SRS resource sets. For example, for one or both of an RV field or a HARQ process number field, bit values of (e.g., all) zero values may indicate or correspond to activation and bit values of (e.g., all) one values may indicate or correspond to release. Alternatively, for one or both of an RV field or a HARQ process number field, bit values of (e.g., all) zero values may indicate or correspond to release and otherwise (e.g., any other bit values outside of all zeros) may indicate or correspond to activation.

In some systems, the network entity 105 and the UE 115 may not use such a design in the case of semi-persistent CSI reporting because FDRA or MCS fields, or both, may be used to indicate a PUSCH resource block allocation and an MCS in case of activation. Thus, if FDRA or MCS fields, or both, are set to reserved values (which may correspond to an invalid resource block allocation or an invalid MCS, or both) the network entity 105 and the UE 115 may expect or determine release. Otherwise, different values may result in the UE 115 and the network entity 105 determining or expecting activation (which may further be subject to other validation values). In the case of semi-persistent SRS, however, and even for activation, FDRA or MCS fields, or both, may be unused (e.g., there may be no PUSCH or PDSCH scheduled with an SP-SRS-RNTI) and available for use as a validation criteria for an activation or release DCI.

In some examples, some fields in the DCI 310-*a* may be unused if activating the SRS resource set 320 and the SRS resource set 325 (e.g., not used for indicating either activation or release or for indicating which SRS resource sets for which the DCI is relevant). Such fields in the DCI 310-*a* that may go unused may include a new data indicator (NDI) field, a time domain resource assignment (TDRA) field, an antenna port(s) field, and a demodulation reference signal (DMRS) sequence initialization field, among other examples. Further, a HARQ process number field, an RV field, an FDRA field, and an MCS field also may be unused if the network entity 105 and the UE 115 do not use them for validation purposes. Even for fields that the network entity 105 and the UE 115 use for validation purposes, not all bits or codepoints may be used. For instance, in examples in which any value outside of all zero values for an RV field or a HARQ process number field corresponds to activation, any of such values may be used for one or more additional purposes.

Accordingly, in implementations in which the DCI 310-*a* is an activation DCI, one or more of the unused fields, codepoints, or bits may be used for one or more other purposes. In other words, an activation DCI may repurpose pre-configured or pre-assigned fields, codepoints, or bits to increase the number of bits for an SRS request filed and/or indicate a parameter(s) associated with one or more activated SRS resources or SRS resource sets. In some implementations, the network entity 105 may use all or a subset of the available bits in the DCI 310-*a* to increase a quantity of bits used for the SRS request field 315-*a*. For example, the SRS request field 315-*a* may sometimes include two bits (which may be capable of conveying four codepoints) and, for more flexibility, the network entity 105 may increase the size of the SRS request field 315-*a* to include a larger quantity of bits. As such, the SRS request field 315-*a* may include two bits, three bits, four bits, five bits, six bits, or more. Due to such a greater number of bits that may be used for the SRS request field 315-*a*, the network entity 105 and the UE 115 may support a more flexible, detailed, precise, or granular mapping between codepoints and different sets of one or more semi-persistent SRS resource sets (as there may potentially be many used bits to build a robust mapping).

Additionally, or alternatively, the network entity 105 may use all or a subset of the available bits in the DCI 310-*a* to indicate one or more parameters associated with one or more of the to be activated SRS resources or SRS resource sets (e.g., one or more parameters associated with one or both of the SRS resource set 320 or the SRS resource set 325). As such, the network entity 105 may indicate one or more updated values for the indicated parameters via the DCI 310-*a* and the UE 115 may update values for the indicated parameters accordingly. In some implementations, the network entity 105 may indicate a new value for each indicated parameter directly in the DCI 310-*a*. Additionally, or alternatively, the network entity 105 may indicate or configure a set of profiles (e.g., configuration profiles) to the UE 115 via control signaling (e.g., via RRC signaling) and may use the DCI 310-*a* to indicate an index associated with one of the profiles. For example, each profile may be RRC configured with a value for each of a set of parameters and may be associated with or identified by a profile index (which the network entity 105 may convey to the UE 115 via the DCI 310-*a*). The network entity 105 may configure a number of the profiles to control or with consideration to a flexibility-overhead tradeoff, as a greater number of profiles may provide greater flexibility at a cost of increased overhead. In some implementations, the network entity 105 may indicate updated values for a first set of one or more parameters via the DCI 310-*a* directly and may indicate updated values for a second set of one or more parameters via a profile index also included in the DCI 310-*a*.

Such parameters for which the network entity 105 may indicate updated values via the DCI 310-*a* may include time domain parameters, frequency domain parameters, spatial- or power-related parameters, parameters related to an SRS sequence, or any combination thereof. Time domain parameters may include a number of symbols and a position within a slot, a slot offset, or a number of repetitions in an SRS resource. Frequency domain parameters may include an SRS bandwidth or a frequency hopping configuration. Spatial- or power-related parameters may include a number of SRS ports, power control parameters such as a transmit power control (TPC) command, open loop parameters such as PO and alpha, or spatial relation information such as an indication of a beam or transmission configuration indicator (TCI) state. Parameters related to an SRS sequence may include a comb spacing, a comb offset (e.g., a combOffset parameter), a cyclic shift, an SRS sequence identity $n_{ID}^{SRS}$ (which may determine or correspond to a sequence group u) or the value of u (e.g., $n_{ID}^{SRS}$ mod 30), or a sequence or group hopping configuration.

In some scenarios, the network entity 105 may transmit a DCI 310-*b* to the UE 115 after the SRS resource set 320 and the SRS resource set 325 are activated. The UE 115 may perform an error check on the DCI 310-*b* or check to see if the DCI 310-*b* includes one or more fields set to specific values, or both, to determine whether the DCI 310-*b* is an activation DCI for semi-persistent SRS resource sets, a release DCI for semi-persistent SRS resource sets, or another type of DCI. In some aspects, the DCI 310-*b* may be a DCI format 0_1, a DCI format 0_2, a DCI format 1_1, or a DCI format 1_2 (as such DCI formats may be used for either activating or releasing one or more semi-persistent SRS resource sets). In some examples, the UE 115 may determine that the DCI 310-*b* is an activation DCI for semi-persistent SRS resource sets and may determine that the DCI 310-*b* indicates an activation for at least one semi-persistent SRS resource set that is already activated (e.g., already activated by the previously received DCI 310-*a*). For example, the UE 115 may determine that the DCI 310-*b* indicates an activation for one or both of the SRS resource set 320 or the SRS resource set 325 (e.g., via a specific codepoint in an SRS request field 315-*b* and in accordance with the configured mapping).

In some implementations, the UE 115 may not expect to receive such another DCI scrambled with SP-SRS-RNTI activating a same semi-persistent SRS resource set and may assume an error case in accordance with receiving the DCI 310-*b* indicating an activation for one or both of the SRS resource set 320 or the SRS resource set 325. In such implementations, the UE 115 may discard (e.g., ignore) the DCI 310-*b* in accordance with the DCI 310-*b* activating one or both of the SRS resource set 320 or the SRS resource set 325 (which are already activated) based on assuming an error case. In other words, reactivation of a semi-persistent SRS resource set may not be allowed before first releasing the semi-persistent SRS resource set.

In some aspects, the UE 115 and the network entity 105 may employ a restriction on reactivation for semi-persistent CSI reporting on a PUSCH. For example, for semi-persistent reporting on a PUSCH, a set of trigger states may be higher layer configured by CSI-SemiPersistentOnPUSCH-Trigger-StateList, where a CSI request field in DCI scrambled with SP-CSI-RNTI activates one of the trigger states. In terms of the restriction on reactivation, the UE 115 may not be expected to receive a DCI scrambled with SP-CSI-RNTI activating one semi-persistent CSI report with a same CSI-ReportConfigId as in a semi-persistent CSI report which is activated by a previously received DCI scrambled with SP-CSI-RNTI.

In some implementations, the UE 115 may similarly not expect to receive such another DCI scrambled with SP-SRS-RNTI activating a same semi-persistent SRS resource set and may assume an error case in accordance with receiving the DCI **310-*b* indicating an activation for one or both of the SRS resource set 320 or the SRS resource set 325. In such implementations, the UE 115 may discard (e.g., ignore) the DCI 310-*b* in accordance with the DCI 310-*b* activating one or both of the SRS resource set 320 or the SRS resource set 325** (which are already activated) based on assuming an error case. In other words, reactivation of a semi-persistent SRS resource set may not be allowed before first releasing the semi-persistent SRS resource set.

In some aspects, the UE 115 and the network entity 105 may employ an update procedure using a reactivation DCI for SPS PDSCH or CG-PUSCH transmissions to update one or more parameters of an already activated SPS PDSCH or CG-PUSCH. In some implementations, the UE 115 may similarly assume that the DCI **310-*b* indicating an activation for a currently activated semi-persistent SRS resource set (e.g., such that the DCI 310-*b* may be a reactivation DCI) is for an update to one or more parameters or resources associated with the currently activated semi-persistent SRS resource set. In other words, if the UE 115 receives another DCI scrambled with SP-SRS-RNTI indicating an activation for a currently active semi-persistent SRS resource set, the UE 115** may update one or more parameters or resources associated with that currently active semi-persistent SRS resource set based on the new DCI.

For example, the DCI **310-*b* may include an indication of an update for one or more parameters or resources associated with the indicated semi-persistent SRS resource set, the UE 115 may update the parameters or resources accordingly, and the UE 115 may continue to transmit an SRS on SRS resources within that SRS resource set periodically using the updated parameters or resources. The network entity 105 may indicate such an update via the DCI 310-*b* via an explicit indication of a new value for one or more parameters in the DCI 310-*b*** or via a profile index.

In some other examples, the UE 115 may determine that the DCI **310-*b* is a release DCI for semi-persistent SRS resource sets and indicates a release of previously activated semi-persistent SRS resource sets. For example, the UE 115 may determine that the DCI 310-*b* indicates a release for one or both of the SRS resource set 320 or the SRS resource set 325 (e.g., via a specific codepoint in the SRS request field 315-*b* and in accordance with the configured mapping). The UE 115 may release the SRS resource set 320 or the SRS resource set 325, or both, accordingly and may refrain from transmitting an SRS using SRS resources within the SRS resource set 320 or the SRS resource set 325, or both, after reception of the DCI 310-*b*. In some aspects, the network entity 105 and the UE 115** may leverage such a DCI-based release to achieve greater interference avoidance with relatively low latency, which may increase a likelihood for successful communication and improve system efficiency.

Figure 4:
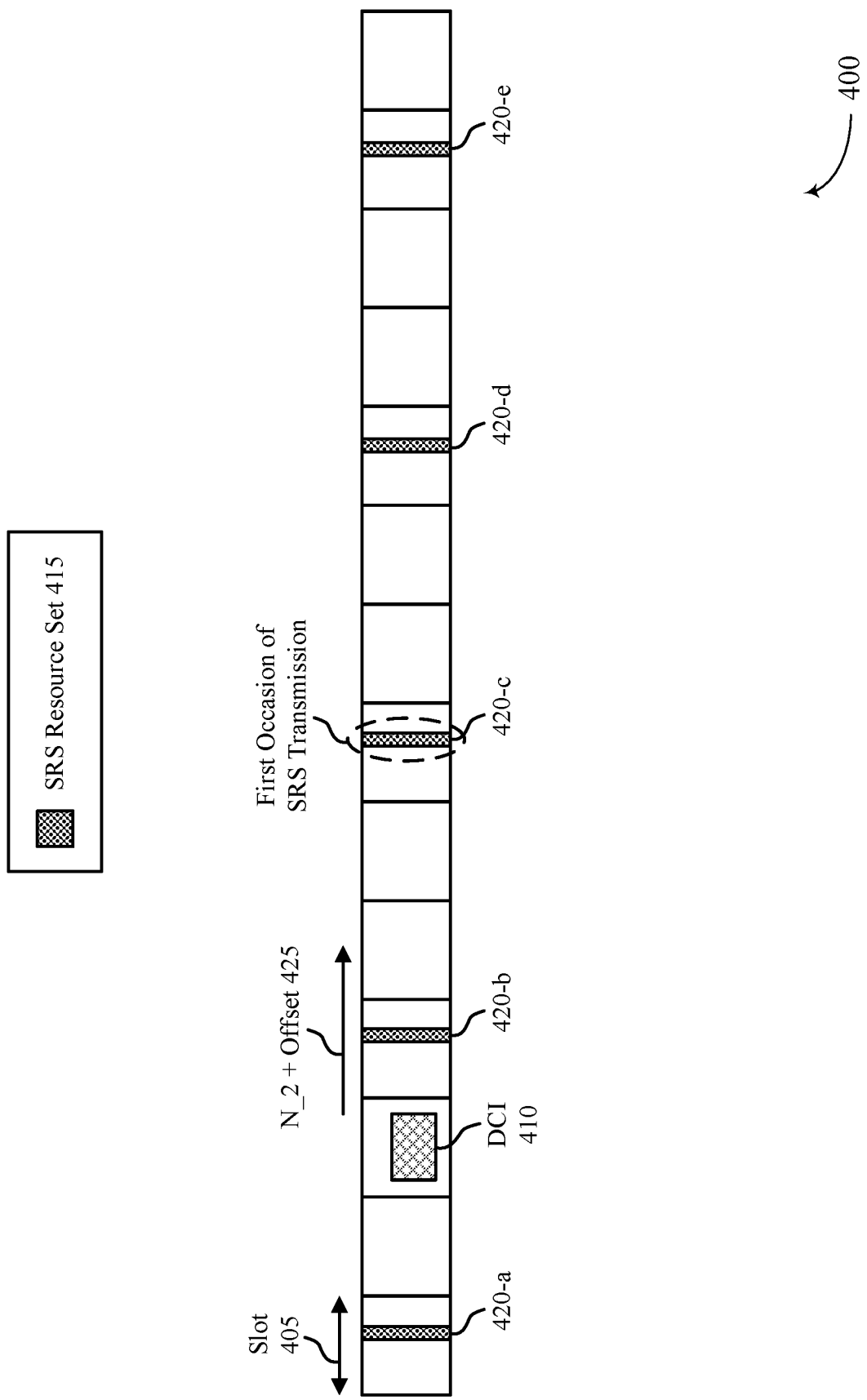

FIG. 4 shows an example of a communication timeline 400 that supports DCI activation for semi-persistent SRS resource sets in accordance with one or more aspects of the present disclosure. The communication timeline 400 may implement or be implemented to realize aspects of the wireless communications system 100 or the wireless communications system 200. For example, the communication timeline 400 may illustrate communication between a UE 115 and a network entity 105 across a number of slots 405. The UE 115 and the network entity 105 may be examples of UEs 115 or the UE **115-*a* and network entities 105 or the network entity 105-*a*, respectively, as illustrated by and described with reference to FIGS. 1 and 2. In some implementations, the UE 115 and the network entity 105 may use the communication timeline 400** to select a first instance or occasion for an SRS transmission after DCI activation of a semi-persistent SRS resource set.

The network entity 105 may indicate a periodicity for a semi-persistent SRS resource set to the UE 115 via control signaling (e.g., RRC signaling) and may use a DCI to activate the semi-persistent SRS resource set. For example, the network entity 105 may transmit a DCI 410 to the UE 115 indicating an activation of an SRS resource set 415 associated with a periodicity of three slots and the UE 115 and the network entity 105 may support a mechanism for determining a first instance of SRS transmission using the activated SRS resource set 415 (e.g., a first slot of the SRS resource set 415 during which the UE 115 may perform an SRS transmission).

Once the first instance is known or determined by the UE 115 and the network entity 105, the UE 115 and the network entity 105 may know or determine all (e.g., a remainder of) instances based on a configured (e.g., an RRC configured) periodicity. For example, in cases in which a semi-persistent SRS resource set is activated by a MAC-CE, the network entity 105 may configure a slot offset and periodicity via an RRC parameter "periodicityAndOffset-sp" per SRS resource set, which the UE 115 and the network entity 105 may use to determine the slots in which the UE 115 transmits SRS in terms of an absolute (e.g., a defined) slot number. For further example, in cases in which an aperiodic SRS resource set is triggered by DCI (e.g., via a one-time triggering, not periodic), the network entity 105 may configure a slot offset with respect to a slot in which the DCI is received via control signaling (e.g., RRC signaling) for each SRS resource set (such that the slot offset is RRC configured per SRS resource set) or via a field of the triggering DCI. In some aspects, the UE 115 may use some amount of time to decode an activation DCI and prepare for a first instance of semi-persistent SRS transmission.

In some implementations, if a semi-persistent SRS resource set is activated by DCI (e.g., if the SRS resource set 415 is activated by the DCI 410), the UE 115 and the network entity 105 may expect or determine that a first or initial slot of a transmission by the UE 115 of SRS resources within the semi-persistent SRS resource set is the first instance of SRS transmission according to a configured (e.g., an RRC configured) periodicityAndOffset parameter (which may be configured per SRS resource) which is at least a time gap associated with a processing capability of the UE 115 and an additional offset after a last symbol of the activating DCI.

For example, and as illustrated by the communication timeline 400, the SRS resource set 415 may be associated with an occasion **420-*a*, an occasion 420-*b*, an occasion 420-*c*, an occasion 420-*d*, and an occasion 420-*e* in accordance with a configured periodicityAndOffset parameter for the SRS resource set 415. In other words, all occasions 420 (e.g., slots) of the SRS resource set 415 may be based on the RRC parameter periodicityAndOffset and may be based on an absolute slot number (e.g., a defined slot number) irrespective of the slot in which the DCI 410** is received.

The UE 115 may determine a first occasion of SRS transmission per SRS resource (of the activated SRS resource set 415) and may transmit a first SRS in the occasion 420-*c* in accordance with the occasion 420-*c* being a first occasion after the time gap associated with the processing capability of the UE 115 and the additional offset after the last symbol of the DCI 410. In some aspects, the time gap associated with the processing capability of the UE 115 may be referred to as $N_2$ and the UE 115 may transmit an indication of $N_2$ to the network entity 105 to ensure mutual awareness of the processing capability of the UE 115. In some aspects, $N_2$ may be based on a UE processing capability timeline for uplink. As such, and as illustrated by the communication timeline 400, the time gap associated with the processing capability of the UE 115 and the additional offset may be equivalently referred to herein as $N_2$+ additional offset 425.

Figure 5:
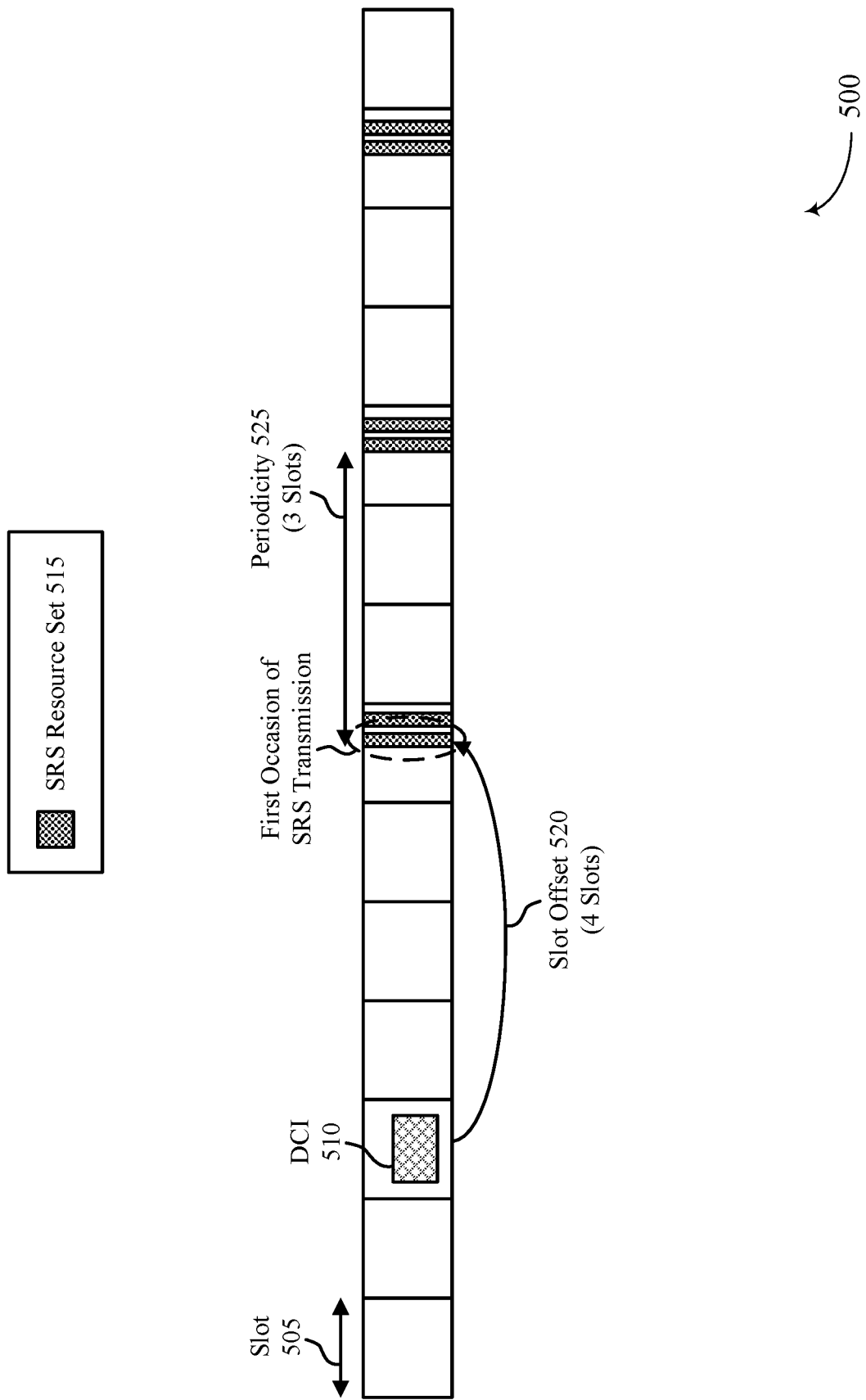

FIG. 5 shows an example of a communication timeline 500 that supports DCI activation for semi-persistent SRS resource sets in accordance with one or more aspects of the present disclosure. The communication timeline 500 may implement or be implemented to realize aspects of the wireless communications system 100 or the wireless communications system 200. For example, the communication timeline 500 may illustrate communication between a UE 115 and a network entity 105 across a number of slots 505. The UE 115 and the network entity 105 may be examples of UEs 115 or the UE 115-*a* and network entities 105 or the network entity 105-*a*, respectively, as illustrated by and described with reference to FIGS. 1 and 2. In some implementations, the UE 115 and the network entity 105 may use the communication timeline 500 to select a first instance or occasion for an SRS transmission after DCI activation of a semi-persistent SRS resource set.

The network entity 105 may indicate a periodicity for a semi-persistent SRS resource set to the UE 115 via control signaling (e.g., RRC signaling) and may use a DCI to activate the semi-persistent SRS resource set. For example, the network entity 105 may transmit a DCI 510 to the UE 115 indicating an activation of an SRS resource set 515 associated with a periodicity 525 of three slots and the UE 115 and the network entity 105 may support a mechanism for determining a first instance of SRS transmission using the activated SRS resource set 515 (e.g., a first slot of the SRS resource set 515 during which the UE 115 may perform an SRS transmission).

In implementations in which the SRS resource set 515 is activated by the DCI 510, the UE 115 and the network entity 105 may expect or determine that a first or initial slot for transmission of the SRS resource set 515 is based on a value of a slot offset 520 with respect to a slot in which the activating DCI 510 is received. As illustrated by the communication timeline 500, the slot offset 520 may be equal to four slots. As such, the UE 115 may transmit a first SRS during an SRS resource of the SRS resource set 515 that is four slots after the DCI 510 (e.g., after a last symbol of the DCI 510) and may subsequently transmit an SRS during each SRS resource of the SRS resource set 515 in accordance with the configured periodicity 525 (which the network entity 105 may indicate to the UE 115 via an RRC parameter periodicityAndOffset). Further, the network entity 105 may indicate or configure the slot offset 520 via control signaling (e.g., RRC signaling, such that the slot offset 520 is RRC configured for the SRS resource set 515) or may indicate the slot offset 520 via field in the DCI 510. The UE 115 and the network entity 105 may make the determination of the first occasion of SRS transmission per SRS resource set.

Figure 6:
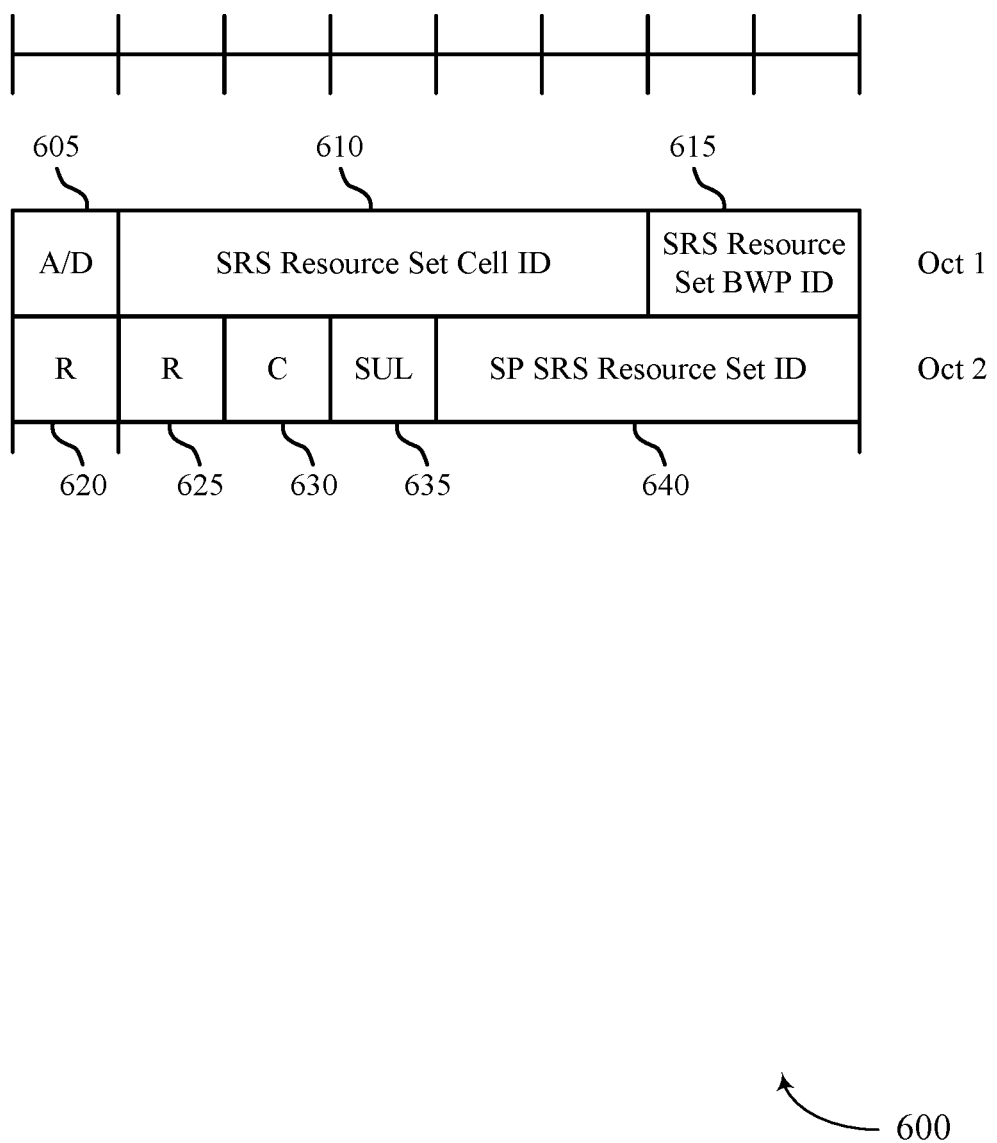
FIG. 6 shows an example of a control element that supports DCI activation for semi-persistent SRS resource sets in accordance with one or more aspects of the present disclosure.

FIG. 6 shows an example of a control element 600 that supports DCI activation for semi-persistent SRS resource sets in accordance with one or more aspects of the present disclosure. The control element 600 may implement or be implemented to realize aspects of the wireless communications system 100 or the wireless communications system 200. For example, a network entity 105 may transmit the control element 600 to a UE 115 to activate a semi-persistent SRS resource set. The UE 115 and the network entity 105 may be examples of UEs 115 or the UE 115-*a* and network entities 105 or the network entity 105-*a*, respectively, as illustrated by and described with reference to FIGS. 1 and 2.

In some implementations, the UE 115 or the network entity 105 may activate or deactivate a semi-persistent SRS resource set using the control element 600, which may be an example of a MAC-CE. For example, the UE 115-*a* or the network entity 105-*a* may transmit the control element 600 indicating an activation or deactivation for one or more semi-persistent SRS resource sets. Once activated, the UE 115 may transmit an SRS over SRS resources within the SRS resource set periodically (e.g., based on a periodicity and offset as configured or indicated by the network entity 105 via control signaling, such as RRC signaling) until another control element 600 deactivates the SRS resource set.

The control element 600 may include a number of octets, of which two are shown, and each octet may convey eight bits and a number of different fields. For example, the control element 600 may include an activation or deactivation (A/D) field 605 indicating whether to activate or deactivate the indicated semi-persistent SRS resource set. The control element 600 also may include an SRS resource set cell ID 610 (e.g., indicating a cell ID, such as a serving cell ID, of the indicated semi-persistent SRS resource set), an SRS resource set BWP ID 615 (e.g., indicating a BWP ID of the SRS resource set), a reserved bit 620, a reserved bit 625, and a C field 630 that indicates whether octets containing resource serving cell ID field(s) and resource BWP ID field(s) are present. The control element 600 also may include an SUL field 635 indicating whether the control element 600 (e.g., a MAC-CE) applies to the NUL carrier or the SUL carrier configuration. The control element 600 also may include an SP SRS resource set ID field 640 that indicates the semi-persistent SRS resource set identified by SRS-ResourceSetId which is to be activated or deactivated.

In some aspects, use of a MAC-CE, such as the control element 600, to activate or deactivate one or more semi-persistent SRS resource sets may introduce higher latency and less flexibility as compared to DCI-based activation or deactivation of one or more semi-persistent SRS resource sets. For example, the network entity 105 may be able to transmit a DCI message more frequently and more dynamically than a MAC-CE, which may enable the network entity 105 to more dynamically activate or release semi-persistent SRS resource sets or to dynamically update one or more parameters associated with activated semi-persistent SRS resources. Such dynamic capability may support greater spectral efficiency and lower signaling overhead and may facilitate or enable more efficient or better performing interference management, especially in scenarios in which multiple UEs 115 may transmit multiple SRSs toward multiple TRPs. As such, in some implementations, the network entity 105 and the UE 115 may support a set of one or more semi-persistent SRS resources associated with MAC-CE activation and deactivation or a set of one or more semi-persistent SRS resources associated with DCI activation and deactivation, or both, based on a deployment scenario or channel conditions between the network entity 105 and the UE 115.

Figure 7:
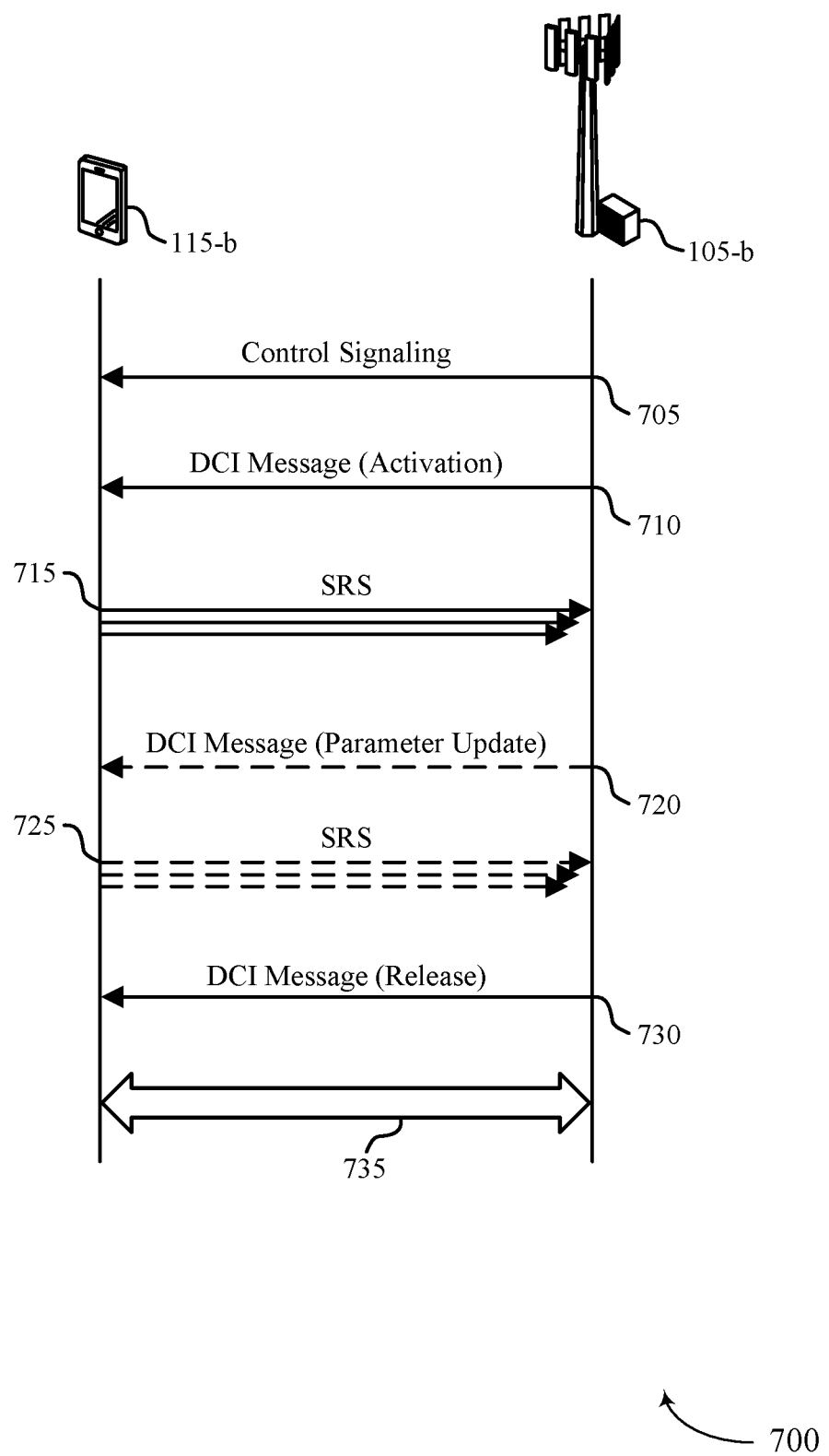
FIG. 7 shows an example of a process flow that supports DCI activation for semi-persistent SRS resource sets in accordance with one or more aspects of the present disclosure.

FIG. 7 shows an example of a process flow 700 that supports DCI activation for semi-persistent SRS resource sets in accordance with one or more aspects of the present disclosure. The process flow 700 may implement or be implemented to realize aspects of the wireless communications system 100, the wireless communications system 200, the communication timeline 300, the communication timeline 400, the communication timeline 500, or the control element 600. For example, the process flow 700 illustrates communication between a UE 115-b and a network entity 105-b, which may be examples of UEs 115 or the UE 115-a and network entities 105 or the network entity 105-a, respectively, as illustrated by and described with reference to FIGS. 1 and 2.

In the following description of the process flow 700, the operations may be performed (such as reported or provided) in a different order than the order shown, or the operations performed by the example devices may be performed in different orders or at different times. Some operations also may be omitted from the process flow 700, or other operations may be added to the process flow 700. Further, although some operations or signaling may be shown to occur at different times for discussion purposes, these operations may actually occur at the same time or otherwise concurrently.

At 705, the UE 115-b may receive, from the network entity 105-b, control signaling indicating a resource type of a set of SRS resource sets as semi-persistent and indicating that the set of SRS resource sets are associated with DCI activation. For example, the UE 115-b may receive RRC signaling from the network entity 105-b indicating or configuring a type of semi-persistent SRS resource sets associated with DCI activation and release. In some implementations, the UE 115-b may receive, via the control signaling, an indication of a mapping between codepoints (e.g., DCI codepoints included in an SRS request field of DCI) and multiple sets of one or more SRS resource sets.

Additionally, or alternatively, the UE 115-b may receive, via the control signaling, an indication of an RNTI associated with a scrambling of activation DCI messages (e.g., an SP-SRS-RNTI). Additionally, or alternatively, the UE 115-b may receive, via the control signaling, an indication of an association between one or more specific fields of a DCI message having a set of specific values (e.g., all one values, all zero values, or values different from all one or zero values) and the DCI message being for activation or release of semi-persistent SRS resource sets. Additionally, or alternatively, the UE 115-b may receive, via the control signaling, an indication of a correspondence between a set of configuration profiles and a set of parameter updates associated with one or more semi-persistent SRS resource sets.

Further, in some implementations, the UE 115-b may receive, via the control signaling, an indication of how time domain occasions associated with semi-persistent SRS resource sets are defined. In some implementations, for example, the control signaling may indicate a defined slot number (e.g., an absolute slot number) and may indicate that occasions of one or more semi-persistent SRS resource sets are defined relative to the defined slot number. In some other implementations, the control signaling may indicate that occasions of one or more semi-persistent SRS resource sets are defined relative to a slot in which an activating DCI is received.

At 710, the UE 115-b may receive, from the network entity 105-b, a first DCI message indicating an activation of one or more SRS resource sets of the set of SRS resource sets having the resource type of semi-persistent. In some implementations, the first DCI message may include a codepoint, of a set of multiple codepoints, corresponding to the one or more SRS resource sets in accordance with the mapping (e.g., the mapping received by the UE 115-b via the control signaling). Such use of a codepoint of a set of multiple codepoints may provide the UE 115-b and the network entity 105-b with greater configurability of activating one or multiple SRS resource sets simultaneously (e.g., with low latency).

In some implementations, the UE 115-b may perform an error check (e.g., a CRC) on the first DCI message using a scrambling sequence associated with the RNTI associated with the scrambling of activation DCI messages (e.g., the SP-SRS-RNTI) received via the control signaling. As such, if the UE 115-b successfully performs the error check on the first DCI message, the UE 115-b may identify or determine that the first DCI message is an activation DCI message for semi-persistent SRS resource sets. Accordingly, the UE 115-b and the network entity 105-b may reduce ambiguity as to what a purpose of the first DCI message is, which may increase decoding efficiency at the UE 115-b and increase a likelihood for successful communication between the UE 115-b and the network entity 105-b.

Additionally, or alternatively, the UE 115-b may receive, in one or more specific fields of the first DCI message, a set of bits that are set to a set of specific values that indicate that the first DCI message is an activation DCI message. For example, the UE 115-b may use the association (as received via the control signaling) between a set of specific values of one or more specific DCI fields and that DCI message being an activation DCI or a release DCI to validate the first DCI message as an activation DCI message for the one or more SRS resource sets. Accordingly, the UE 115-b and the network entity 105-b may reduce ambiguity as to what a purpose of the first DCI message is, which may increase decoding efficiency at the UE 115-b and increase a likelihood for successful communication between the UE 115-b and the network entity 105-b.

In some implementations, the UE 115-b may receive an indication of an update for one or more parameters via the first DCI message. The UE 115-b may receive the indication of the update directly via the first DCI message or the first DCI message may include a configuration profile corresponding to a configured update for the one or more parameters (e.g., based on the correspondence between the set of configuration profiles and a set of parameter updates as received via the control signaling). The UE 115-b may update a memory of the UE 115-b based on the update and the update may be valid permanently, until a next update is received, or for an indicted duration. In accordance with supporting such a dynamic parameter update via an activation DCI message, the UE 115-b and the network entity 105-b may have greater control or management capability over interference associated with SRS transmissions.

At 715, the UE 115-b may transmit, to the network entity 105-b, an SRS during each of a set of periodic occasions associated with the one or more SRS resource sets based on the DCI activation and in accordance with the resource type of the one or more SRS resource sets being semi-persistent.

In some implementations, such as in implementations in which the first DCI message indicates an update for one or more parameters associated with the one or more SRS resource sets, the UE 115-*b* may transmit the SRSs using the updated parameters. In some aspects, the UE 115-*b* may transmit the SRSs to the network entity 105-*b* directly. Additionally, or alternatively, the UE 115-*b* may transmit the SRSs to one or multiple TRPs associated with the network entity 105-*b*, such as the TRP 205 and the TRP 210 as illustrated and described with reference to FIG. 2.

In some implementations, the UE 115-*b* may select a first occasion of the one or more SRS resource sets for transmitting an SRS after an offset value relative to a slot in which the first DCI message is received at 710. In such implementations, the UE 115-*b* may receive an indication of the slot offset value via the control signaling or the first DCI message, or both, and occasions of the one or more SRS resources sets may be defined relative to the slot in which the first DCI message is received. In some other implementations, the UE 115-*b* may select a first occasion of the one or more SRS resource sets for transmitting an SRS after a time gap associated with a processing capability of the UE 115-*b* (e.g., N2) and an additional offset relative to a slot in which the first DCI message is received at 710. In such implementations, the UE 115-*b* may receive an indication of the additional offset from the network entity 105-*b*, transmit an indication of the time gap associated with the processing capability of the UE 115-*b* to the network entity 105-*b*, and occasions of the one or more SRS resource sets may be defined relative to a defined or absolute slot number indicated by the control signaling at 705.

In some implementations, at 720, the UE 115 may receive, from the network entity 105-*b*, a DCI message (e.g., a second DCI message) indicating an activation of at least one SRS resource set of the one or more SRS resource sets already activated by the first DCI message received at 710. In some implementations, the UE 115-*b* may discard the DCI message in accordance with the second DCI message indicating the activation for an already activated SRS resource set based on assuming such a reactivation DCI for an SRS resource activated by a previously received DCI is an error case. In such implementations, the UE 115-*b* may maintain synchronization on expectations for how the UE 115-*b* handles such reactivation DCI and the discarding of the DCI message may reduce a processing burden at the UE 115-*b*, which may improve battery life. Further, in some aspects, the network entity 105-*b* may discard the DCI message prior to sending the DCI message to the UE 115-*b* in accordance with identifying the error case, which may reduce signaling overhead and also reduce a processing burden at the UE 115-*b*.

In some other implementations, the UE 115-*b* may use the DCI message to update one or more parameters associated with the at least one SRS resource set. For example, the DCI message may indicate an update for one or more parameters associated with the at least one SRS resource set and the UE 115-*b* may update a value of each of the one or more parameters accordingly. In such implementations, the UE 115-*b* may maintain synchronization on expectations for how the UE 115-*b* handles such reactivation DCI and the use of the DCI (e.g., a reactivation DCI) for conveying a parameter update may further support greater control or management capability over interference associated with SRS transmissions.

In some implementations, at 725, the UE 115-*b* may transmit, to the network entity 105-*b* or one or more TRPs associated with the network entity 105-*b*, an SRS during each of a next set of periodic occasions associated with the one or more SRS resource sets based on the DCI activation and the parameter update received at 720. In such implementations, the UE 115-*b* may transmit an SRS over the next set of periodic occasions using different time domain resources, different frequency domain resources, different power control parameters, or different spatial parameters to reduce system interference or to increase a likelihood for accurate channel estimation.

At 730, the UE 115-*b* may receive, from the network entity 105-*b*, a DCI message (e.g., a second DCI message) indicating a deactivation of the one or more SRS resource sets. In some implementations, the DCI message may indicate the deactivation for the one or more SRS resource sets via a codepoint in an SRS request field and based on being scrambled in accordance with an RNTI associated with deactivation DCI messages for semi-persistent SRS resource sets (e.g., an SP-SRS-RNTI). Additionally, or alternatively, the DCI message may indicate the deactivation for the one or more SRS resource sets based on one or more fields of the DCI message including a set of specific values that correspond to a deactivation DCI message for semi-persistent SRS resource sets. In accordance with such a dynamic (e.g., DCI-based) deactivation of the one or more SRS resource sets, the UE 115-*b* and the network entity 105-*b* may experience lower latency and lower signaling overhead as compared to other activation mechanisms.

At 735, the UE 115-*b* and the network entity 105-*b* may communicate based on the SRS transmissions from the UE 115-*b*. For example, the network entity 105-*b*, or one or more TRPs associated with the network entity 105-*b*, may perform a channel estimation using the SRS transmissions from the UE 115-*b* and may use the channel estimation for a coherent joint transmission from the one or more TRPs.

Figure 8:
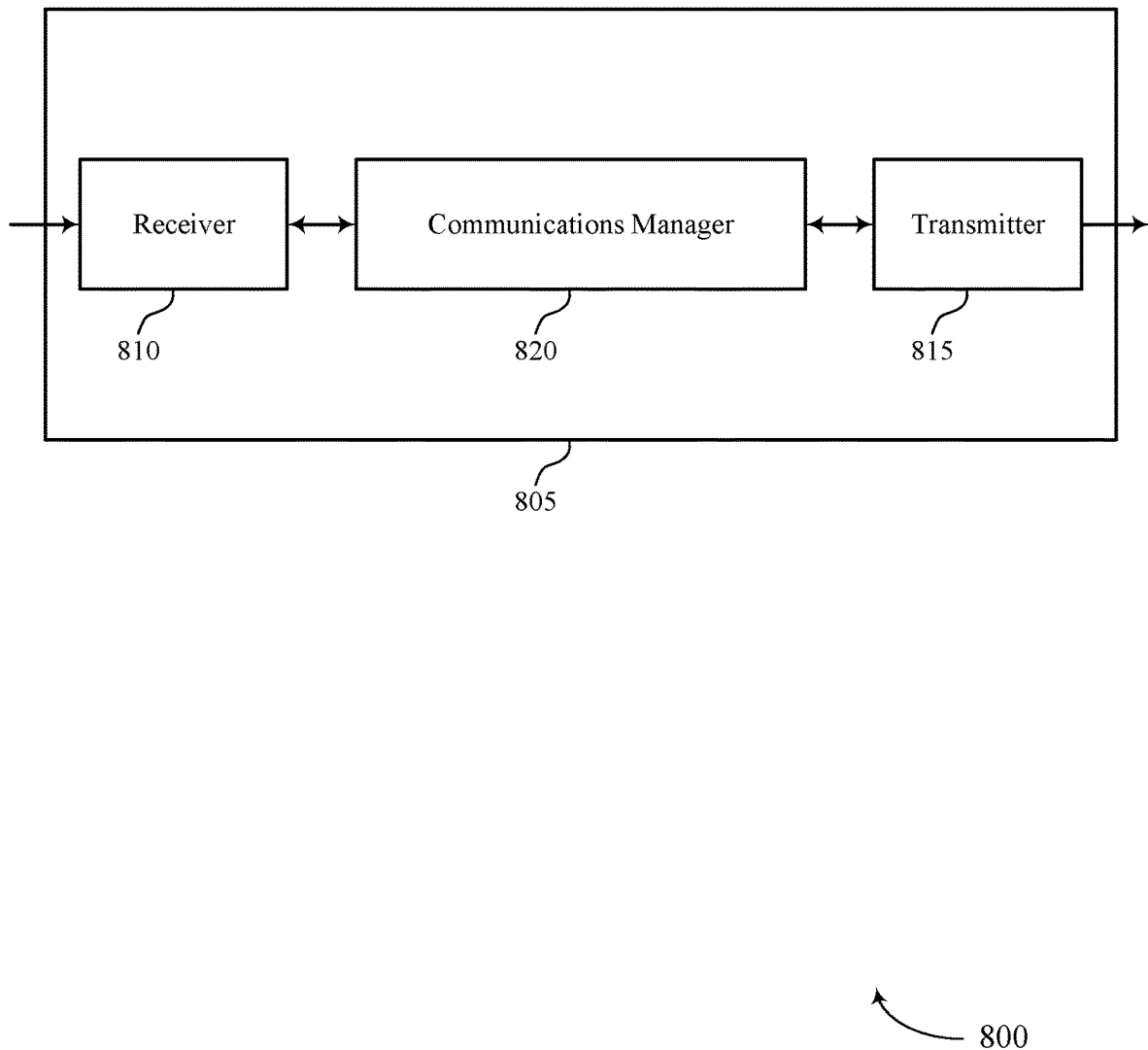
FIGS. 8 and 9 show block diagrams of devices that support DCI activation for semi-persistent SRS resource sets in accordance with one or more aspects of the present disclosure.

FIG. 8 shows a block diagram 800 of a device 805 that supports DCI activation for semi-persistent SRS resource sets in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to DCI activation for semi-persistent SRS resource sets). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to DCI activation for semi-persistent SRS resource sets). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of DCI activation for semi-persistent SRS resource sets as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. For example, the communications manager 820 may be configured as or otherwise support a means for receiving control signaling indicating a resource type of a set of SRS resource sets as semi-persistent and indicating that the set of SRS resource sets are associated with DCI activation. The communications manager 820 may be configured as or otherwise support a means for receiving a first DCI message indicating an activation of one or more SRS resource sets of the set of SRS resource sets. The communications manager 820 may be configured as or otherwise support a means for transmitting an SRS during each of a set of multiple periodic occasions associated with the one or more SRS resource sets based on the DCI activation of the one or more SRS resource sets and in accordance with the resource type of the one or more SRS resource sets being semi-persistent.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources.

Figure 9:
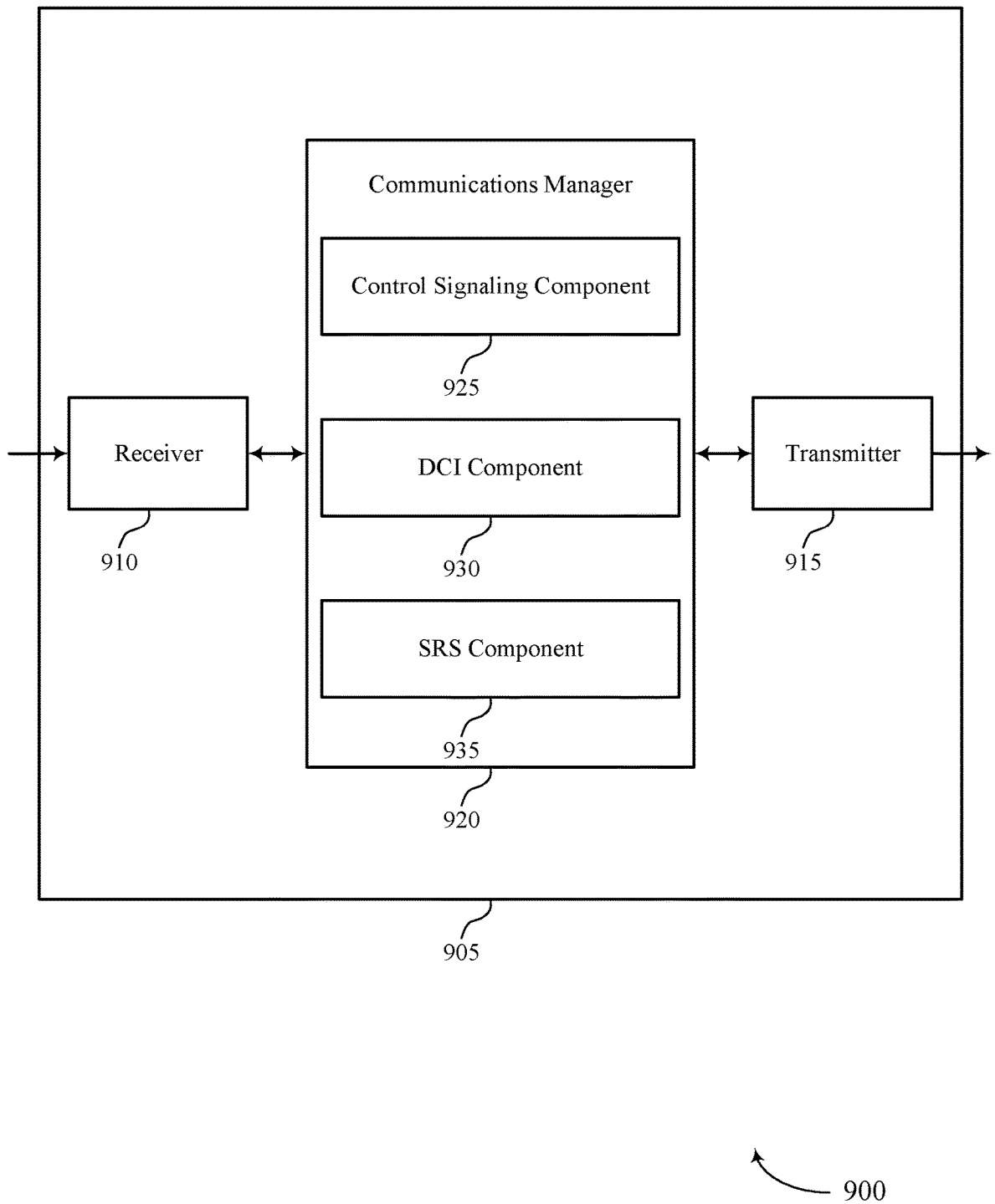

FIG. 9 shows a block diagram 900 of a device 905 that supports DCI activation for semi-persistent SRS resource sets in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to DCI activation for semi-persistent SRS resource sets). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to DCI activation for semi-persistent SRS resource sets). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of DCI activation for semi-persistent SRS resource sets as described herein. For example, the communications manager 920 may include a control signaling component 925, a DCI component 930, an SRS component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. The control signaling component 925 may be configured as or otherwise support a means for receiving control signaling indicating a resource type of a set of SRS resource sets as semi-persistent and indicating that the set of SRS resource sets are associated with DCI activation. The DCI component 930 may be configured as or otherwise support a means for receiving a first DCI message indicating an activation of one or more SRS resource sets of the set of SRS resource sets. The SRS component 935 may be configured as or otherwise support a means for transmitting an SRS during each of a set of multiple periodic occasions associated with the one or more SRS resource sets based on the DCI activation of the one or more SRS resource sets and in accordance with the resource type of the one or more SRS resource sets being semi-persistent.

Figure 10:
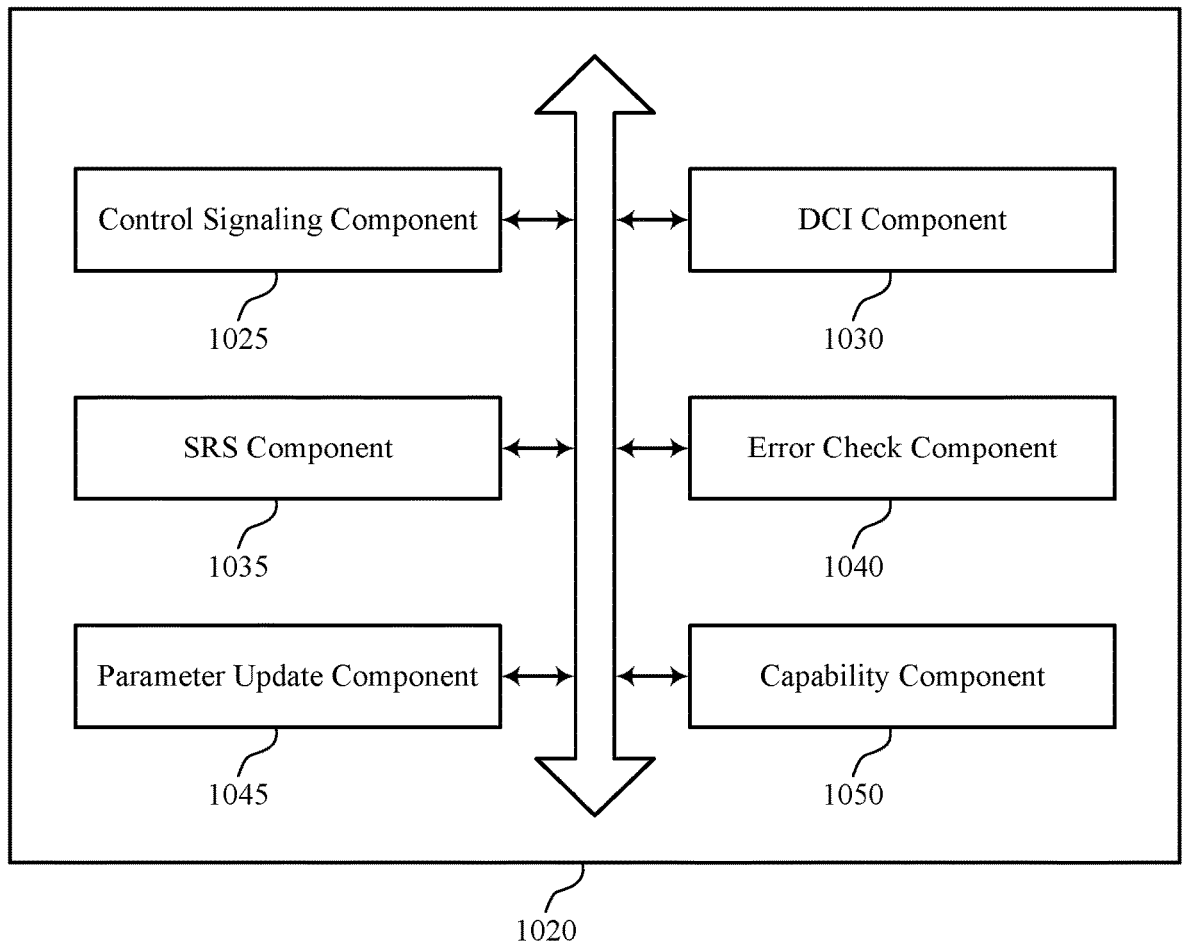
FIG. 10 shows a block diagram of a communications manager that supports DCI activation for semi-persistent SRS resource sets in accordance with one or more aspects of the present disclosure.

FIG. 10 shows a block diagram 1000 of a communications manager 1020 that supports DCI activation for semi-persistent SRS resource sets in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of DCI activation for semi-persistent SRS resource sets as described herein. For example, the communications manager 1020 may include a control signaling component 1025, a DCI component 1030, an SRS component 1035, an error check component 1040, a parameter update component 1045, a capability component 1050, or any combination thereof. Each of these components may communicate, directly or indirectly, with one another (e.g., via one or more buses).

The communications manager 1020 may support wireless communication at a UE in accordance with examples as disclosed herein. The control signaling component 1025 may be configured as or otherwise support a means for receiving control signaling indicating a resource type of a set of SRS resource sets as semi-persistent and indicating that the set of SRS resource sets are associated with DCI activation. The DCI component 1030 may be configured as or otherwise support a means for receiving a first DCI message indicating an activation of one or more SRS resource sets of the set of SRS resource sets. The SRS component 1035 may be configured as or otherwise support a means for transmitting an SRS during each of a set of multiple periodic occasions associated with the one or more SRS resource sets based on the DCI activation of the one or more SRS resource sets and in accordance with the resource type of the one or more SRS resource sets being semi-persistent.

In some examples, to support receiving the first DCI message indicating the activation of the one or more SRS resource sets, the DCI component 1030 may be configured as or otherwise support a means for receiving, in the first DCI message, a codepoint of the set of multiple codepoints corresponding to the one or more SRS resource sets in accordance with the mapping.

In some examples, the control signaling indicates a RNTI associated with a scrambling of activation DCI messages for SRS resource sets having the resource type of semi-persistent, and the error check component 1040 may be configured as or otherwise support a means for performing an error check on the first DCI message using a scrambling sequence associated with the RNTI, where a successful error check using the scrambling sequence associated with the RNTI indicates that the first DCI message is an activation DCI message for the one or more SRS resource sets.

In some examples, to support receiving the first DCI message indicating the activation of the one or more SRS resource sets, the DCI component 1030 may be configured as or otherwise support a means for receiving, in the one or more fields of the first DCI message, a set of bits that are set to the set of multiple specific values.

In some examples, to support receiving the first DCI message indicating the activation of the one or more SRS resource sets, the DCI component 1030 may be configured as or otherwise support a means for receiving, in the first DCI message, an indication of an update for one or more parameters associated with the one or more SRS resource sets, where transmitting the SRS during each of the set of multiple periodic occasions associated with the one or more SRS resource sets is based on receiving the indication of the update for the one or more parameters.

In some examples, the control signaling indicates a value for each of the one or more parameters, and the parameter update component 1045 may be configured as or otherwise support a means for updating the value stored at the UE for each of the one or more parameters based on the indication of the update for the one or more parameters in the first DCI message, where transmitting the SRS during each of the set of multiple periodic occasions associated with the one or more SRS resource sets is based on updating the value for each of the one or more parameters.

In some examples, the first DCI message indicates the update for the one or more parameters in accordance with explicitly indicating a value for each of the one or more parameters.

In some examples, the control signaling indicates a correspondence between a set of configuration profiles and a set of parameter updates. In some examples, the first DCI message indicates the update for the one or more parameters in accordance with indicating a configuration profile of the set of configuration profiles.

In some examples, the DCI component 1030 may be configured as or otherwise support a means for receiving a second DCI message indicating an activation of at least one SRS resource set of the one or more SRS resource sets. In some examples, the DCI component 1030 may be configured as or otherwise support a means for discarding the second DCI message in accordance with the second DCI message indicating the activation of the at least one SRS resource set, where receiving the second DCI message indicating the activation of the at least one SRS resource set of the one or more SRS resource sets is associated with an error case.

In some examples, the DCI component 1030 may be configured as or otherwise support a means for receiving a second DCI message indicating an activation of at least one SRS resource set of the one or more SRS resource sets, where the second DCI message includes an indication of an update for one or more parameters associated with the at least one SRS resource set. In some examples, the parameter update component 1045 may be configured as or otherwise support a means for updating a value of the one or more parameters associated with the at least one SRS resource set based on the indication of the update for the one or more parameters and in accordance with the second DCI message indicating the activation of the at least one SRS resource set.

In some examples, the control signaling indicates a defined slot number and, to support indicates that occasions of the one or more SRS resource sets are defined relative to the defined slot number, and where transmitting the SRS during each of the set of multiple periodic occasions associated with the one or more SRS resource sets, the SRS component 1035 may be configured as or otherwise support a means for transmitting a first SRS in a first occasion of the one or more SRS resource sets after a time gap associated with a processing capability of the UE and an additional offset relative to a slot in which the first DCI message is received.

In some examples, the capability component 1050 may be configured as or otherwise support a means for transmitting, to a network entity, an indication of the time gap associated with the processing capability of the UE.

In some examples, to support transmitting the SRS during each of the set of multiple periodic occasions associated with the one or more SRS resource sets, the SRS component 1035 may be configured as or otherwise support a means for transmitting a first SRS in a first occasion of the one or more SRS resource sets after an offset value relative to the slot in which the first DCI message is received.

In some examples, the offset value is received via at least one of the control signaling or the first DCI message.

In some examples, the DCI component 1030 may be configured as or otherwise support a means for receiving a second DCI message indicating a deactivation of the one or more SRS resource sets, where the second DCI message indicates the deactivation of the one or more SRS resource sets based on at least one of being scrambled in accordance with a RNTI associated with deactivation DCI messages for SRS resource sets having the resource type of semi-persistent or one or more fields of the second DCI message having a set of multiple specific values.

Figure 11:
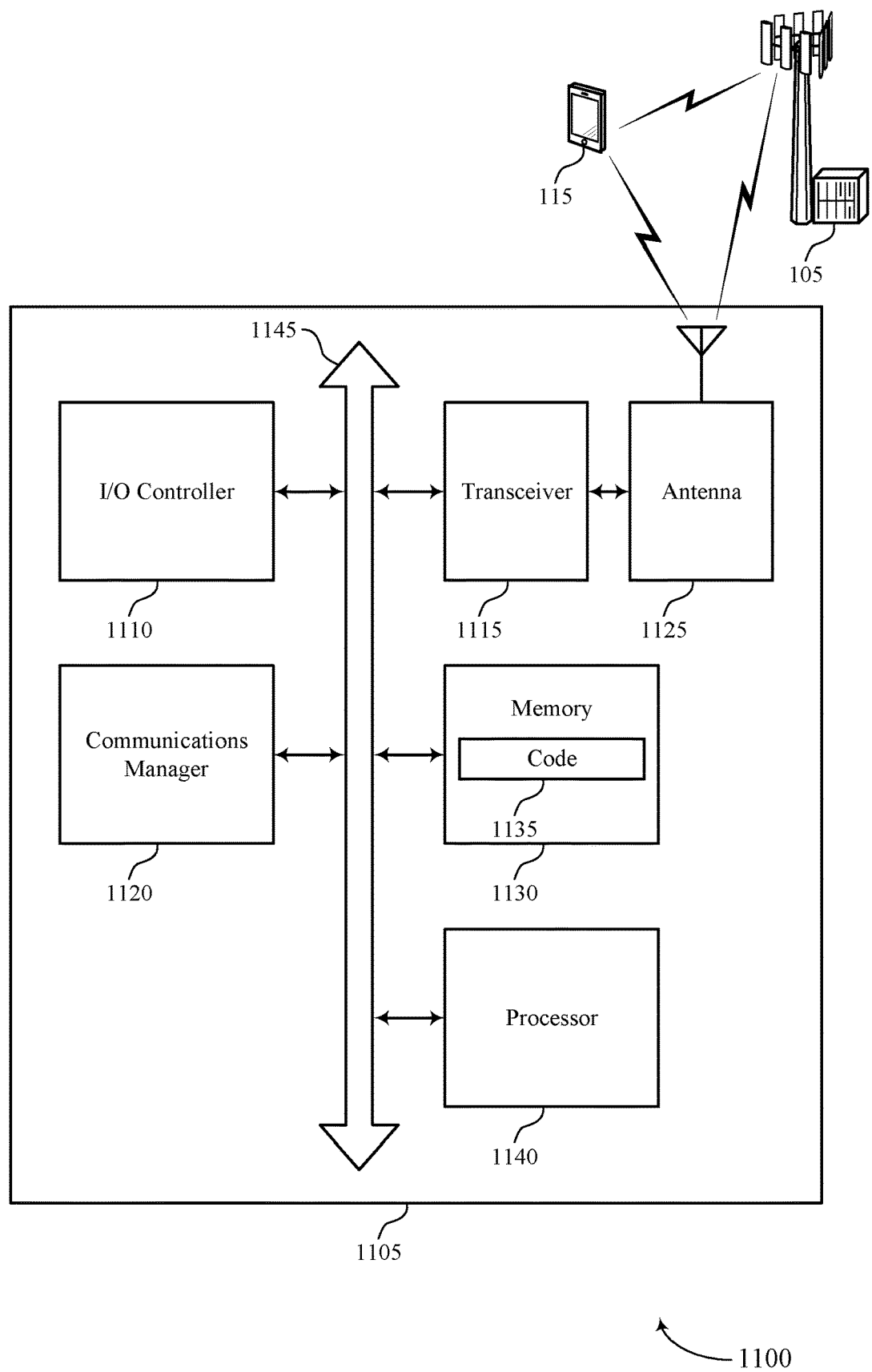
FIG. 11 shows a diagram of a system including a device that supports DCI activation for semi-persistent SRS resource sets in accordance with one or more aspects of the present disclosure.

FIG. 11 shows a diagram of a system 1100 including a device 1105 that supports DCI activation for semi-persistent SRS resource sets in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting DCI activation for semi-persistent SRS resource sets). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving control signaling indicating a resource type of a set of SRS resource sets as semi-persistent and indicating that the set of SRS resource sets are associated with DCI activation. The communications manager 1120 may be configured as or otherwise support a means for receiving a first DCI message indicating an activation of one or more SRS resource sets of the set of SRS resource sets. The communications manager 1120 may be configured as or otherwise support a means for transmitting an SRS during each of a set of multiple periodic occasions associated with the one or more SRS resource sets based on the DCI activation of the one or more SRS resource sets and in accordance with the resource type of the one or more SRS resource sets being semi-persistent.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of DCI activation for semi-persistent SRS resource sets as described herein, or the processor 1140 and the memory 1130 may be otherwise configured to perform or support such operations.

Figure 12:
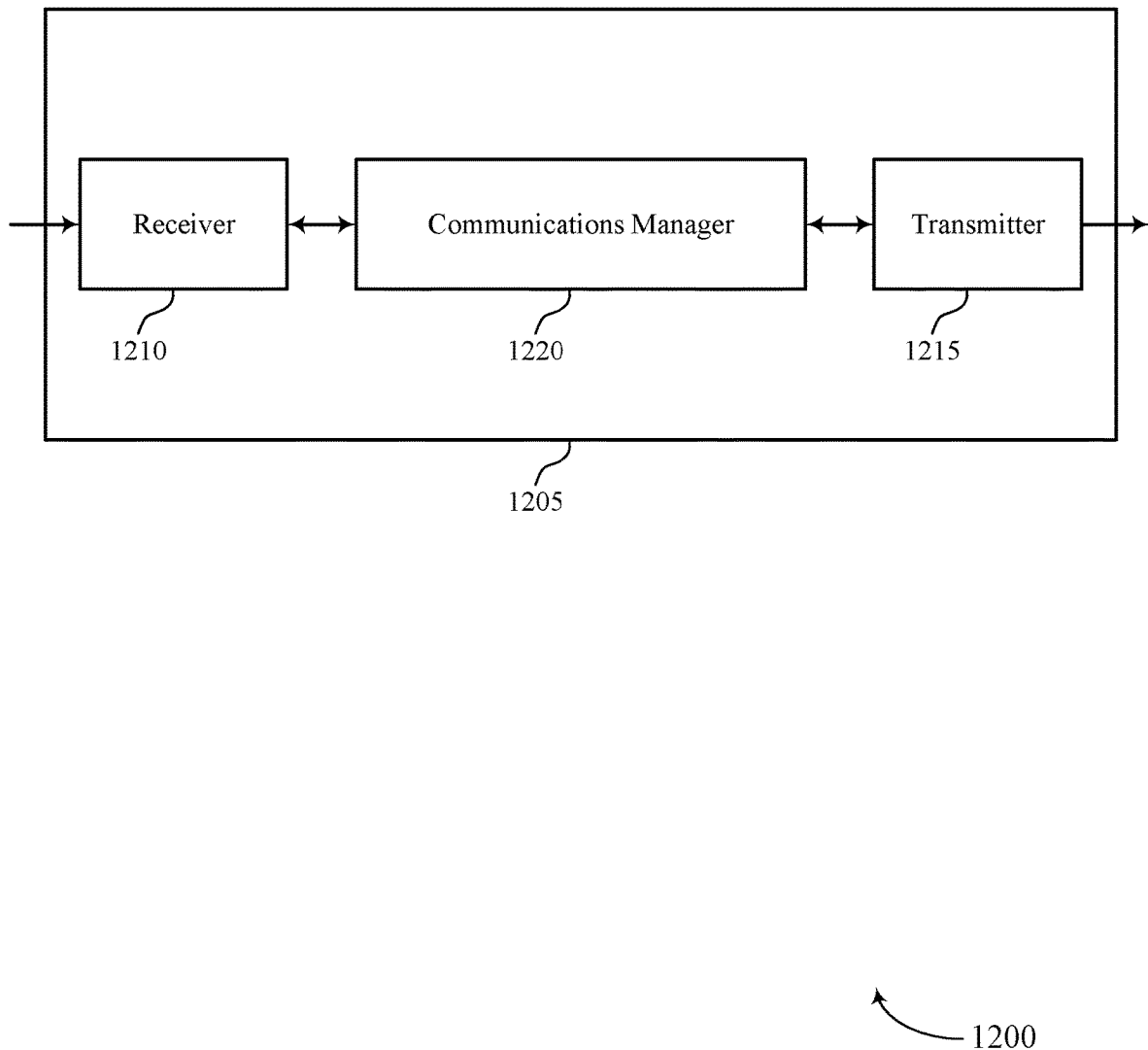
FIGS. 12 and 13 show block diagrams of devices that support DCI activation for semi-persistent SRS resource sets in accordance with one or more aspects of the present disclosure.

FIG. 12 shows a block diagram 1200 of a device 1205 that supports DCI activation for semi-persistent SRS resource sets in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of DCI activation for semi-persistent SRS resource sets as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. For example, the communications manager 1220 may be configured as or otherwise support a means for outputting control signaling indicating a resource type of a set of SRS resource sets as semi-persistent and indicating that the set of SRS resource sets are associated with DCI activation. The communications manager 1220 may be configured as or otherwise support a means for outputting a first DCI message indicating an activation of one or more SRS resource sets of the set of SRS resource sets. The communications manager 1220 may be configured as or otherwise support a means for obtaining an SRS during each of a set of multiple periodic occasions associated with the one or more SRS resource sets based on the DCI activation of the one or more SRS resource sets and in accordance with the resource type of the one or more SRS resource sets being semi-persistent.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for reduced processing, reduced power consumption, and more efficient utilization of communication resources.

Figure 13:
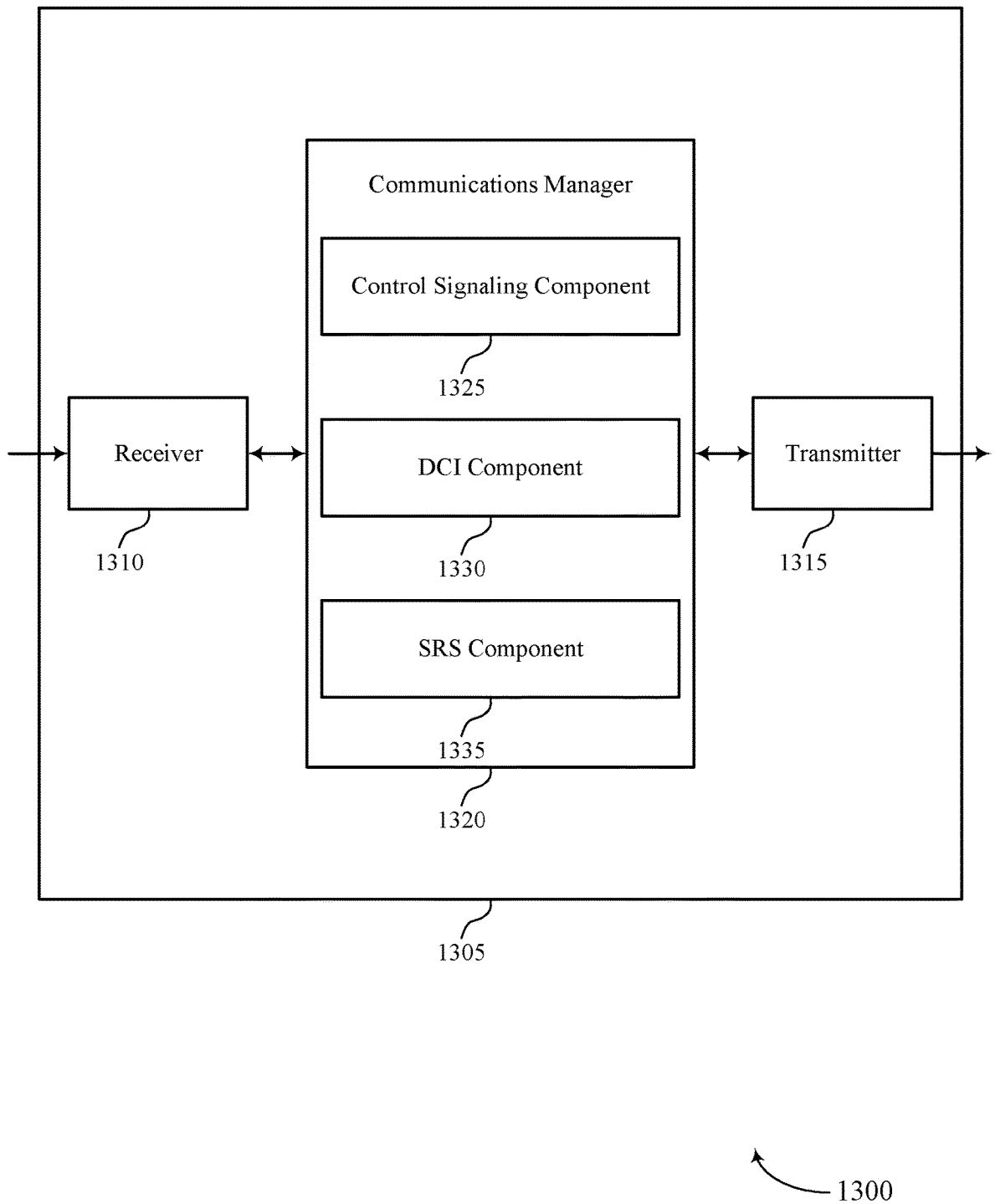

FIG. 13 shows a block diagram 1300 of a device 1305 that supports DCI activation for semi-persistent SRS resource sets in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device

1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of DCI activation for semi-persistent SRS resource sets as described herein. For example, the communications manager 1320 may include a control signaling component 1325, a DCI component 1330, an SRS component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. The control signaling component 1325 may be configured as or otherwise support a means for outputting control signaling indicating a resource type of a set of SRS resource sets as semi-persistent and indicating that the set of SRS resource sets are associated with DCI activation. The DCI component 1330 may be configured as or otherwise support a means for outputting a first DCI message indicating an activation of one or more SRS resource sets of the set of SRS resource sets. The SRS component 1335 may be configured as or otherwise support a means for obtaining an SRS during each of a set of multiple periodic occasions associated with the one or more SRS resource sets based on the DCI activation of the one or more SRS resource sets and in accordance with the resource type of the one or more SRS resource sets being semi-persistent.

Figure 14:
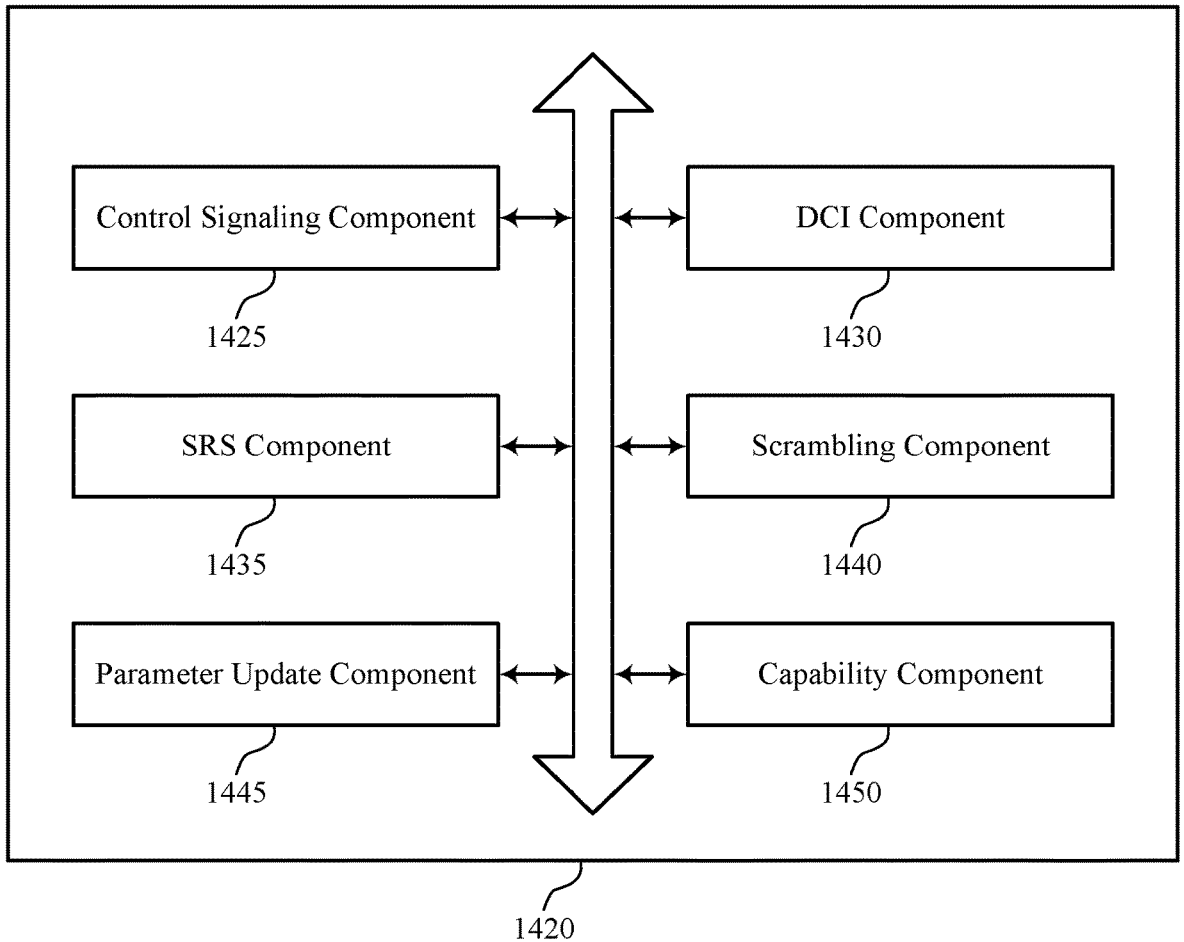
FIG. 14 shows a block diagram of a communications manager that supports DCI activation for semi-persistent SRS resource sets in accordance with one or more aspects of the present disclosure.

FIG. 14 shows a block diagram 1400 of a communications manager 1420 that supports DCI activation for semi-persistent SRS resource sets in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of DCI activation for semi-persistent SRS resource sets as described herein. For example, the communications manager 1420 may include a control signaling component 1425, a DCI component 1430, an SRS component 1435, a scrambling component 1440, a parameter update component 1445, a capability component 1450, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a network entity in accordance with examples as disclosed herein. The control signaling component 1425 may be configured as or otherwise support a means for outputting control signaling indicating a resource type of a set of SRS resource sets as semi-persistent and indicating that the set of SRS resource sets are associated with DCI activation. The DCI component 1430 may be configured as or otherwise support a means for outputting a first DCI message indicating an activation of one or more SRS resource sets of the set of SRS resource sets. The SRS component 1435 may be configured as or otherwise support a means for obtaining an SRS during each of a set of multiple periodic occasions associated with the one or more SRS resource sets based on the DCI activation of the one or more SRS resource sets and in accordance with the resource type of the one or more SRS resource sets being semi-persistent.

In some examples, to support outputting the first DCI message indicating the activation of the one or more SRS resource sets, the DCI component 1430 may be configured as or otherwise support a means for outputting, in the first DCI message, a codepoint of the set of multiple codepoints corresponding to the one or more SRS resource sets in accordance with the mapping.

In some examples, the control signaling indicates a RNTI associated with a scrambling of activation DCI messages for SRS resource sets having the resource type of semi-persistent, and the scrambling component 1440 may be configured as or otherwise support a means for scrambling the first DCI message using a scrambling sequence associated with the RNTI in accordance with the first DCI message being an activation DCI message for the one or more SRS resource sets.

In some examples, to support outputting the first DCI message indicating the activation of the one or more SRS resource sets, the DCI component 1430 may be configured as or otherwise support a means for outputting, in the one or more fields of the first DCI message, a set of bits that are set to the set of multiple specific values.

In some examples, to support outputting the first DCI message indicating the activation of the one or more SRS resource sets, the DCI component 1430 may be configured as or otherwise support a means for outputting, in the first DCI message, an indication of an update for one or more parameters associated with the one or more SRS resource sets, where obtaining the SRS during each of the set of multiple periodic occasions associated with the one or more SRS resource sets is based on transmitting the indication of the update for the one or more parameters.

In some examples, the control signaling indicates a value for each of the one or more parameters, and the parameter update component 1445 may be configured as or otherwise support a means for updating the value stored at the network entity for each of the one or more parameters based on the indication of the update for the one or more parameters in the first DCI message, where obtaining the SRS during each of the set of multiple periodic occasions associated with the one or more SRS resource sets is based on updating the value for each of the one or more parameters.

In some examples, the first DCI message indicates the update for the one or more parameters in accordance with explicitly indicating a value for each of the one or more parameters.

In some examples, the control signaling indicates a correspondence between a set of configuration profiles and a set of parameter updates. In some examples, the first DCI message indicates the update for the one or more parameters in accordance with indicating a configuration profile of the set of configuration profiles.

In some examples, the DCI component 1430 may be configured as or otherwise support a means for generating a second DCI message indicating an activation of at least one SRS resource set of the one or more SRS resource sets. In some examples, the DCI component 1430 may be configured as or otherwise support a means for discarding the second DCI message in accordance with the second DCI message indicating the activation of the at least one SRS resource set, where generating the second DCI message indicating the activation of the at least one SRS resource set of the one or more SRS resource sets is associated with an error case.

In some examples, the DCI component 1430 may be configured as or otherwise support a means for outputting a second DCI message indicating an activation of at least one SRS resource set of the one or more SRS resource sets, where the second DCI message includes an indication of an update for one or more parameters associated with the at least one SRS resource set. In some examples, the parameter update component 1445 may be configured as or otherwise support a means for updating a value of the one or more parameters associated with the at least one SRS resource set based on the indication of the update for the one or more parameters and in accordance with the second DCI message indicating the activation of the at least one SRS resource set.

In some examples, the control signaling indicates a defined slot number and, to support indicates that occasions of the one or more SRS resource sets are defined relative to the defined slot number, and where obtaining the SRS during each of the set of multiple periodic occasions associated with the one or more SRS resource sets, the SRS component 1435 may be configured as or otherwise support a means for obtaining a first SRS in a first occasion of the one or more SRS resource sets after a time gap associated with a processing capability of a UE and an additional offset relative to a slot in which the first DCI message is output.

In some examples, the capability component 1450 may be configured as or otherwise support a means for obtaining an indication of the time gap associated with the processing capability of the UE.

In some examples, to support obtaining the SRS during each of the set of multiple periodic occasions associated with the one or more SRS resource sets, the SRS component 1435 may be configured as or otherwise support a means for obtaining a first SRS in a first occasion of the one or more SRS resource sets after an offset value relative to the slot in which the first DCI message is output.

In some examples, the offset value is received via at least one of the control signaling or the first DCI message.

In some examples, the DCI component 1430 may be configured as or otherwise support a means for outputting a second DCI message indicating a deactivation of the one or more SRS resource sets, where the second DCI message indicates the deactivation of the one or more SRS resource sets based on at least one of being scrambled in accordance with a RNTI associated with deactivation DCI messages for SRS resource sets having the resource type of semi-persistent or one or more fields of the second DCI message having a set of multiple specific values.

Figure 15:
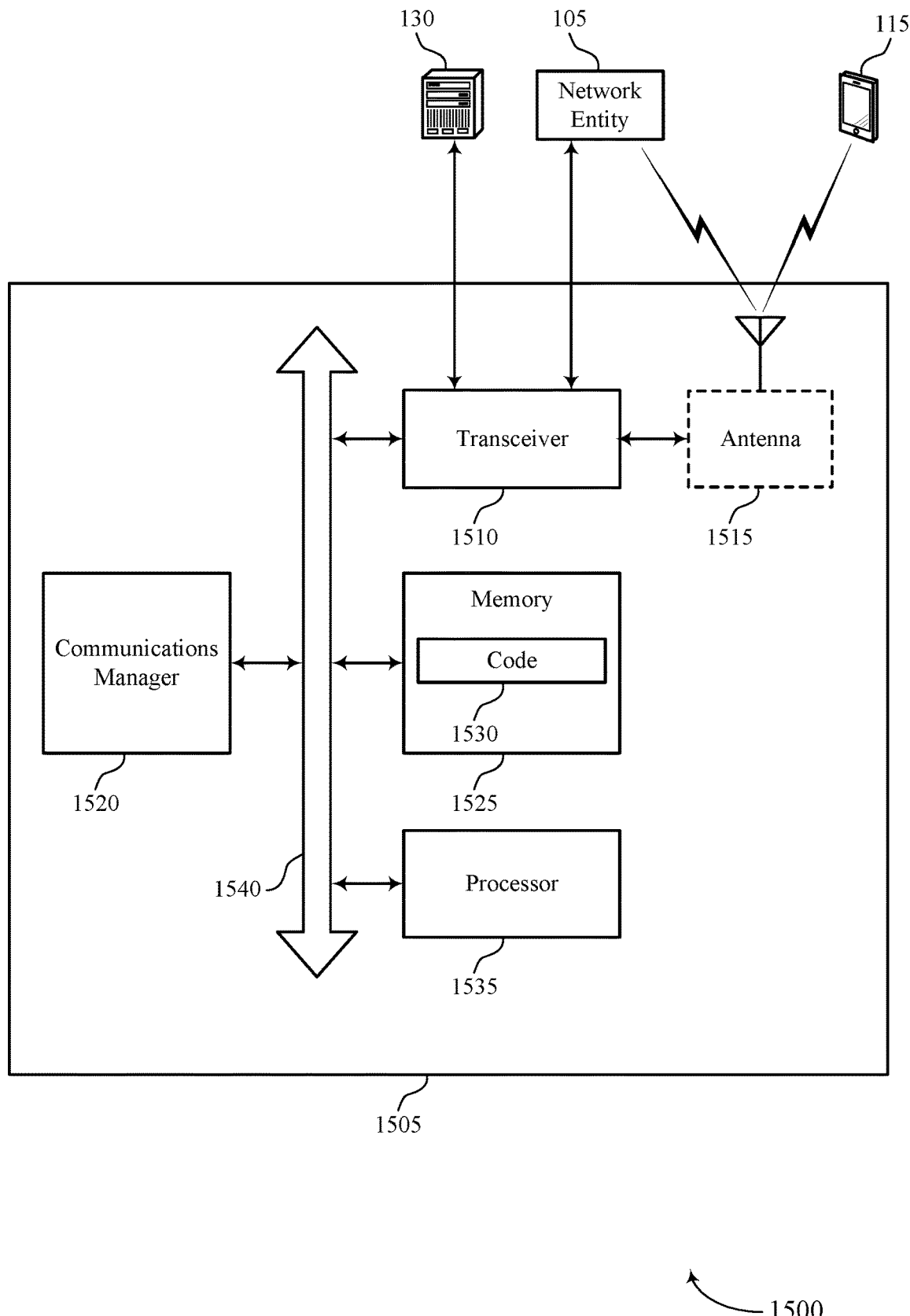
FIG. 15 shows a diagram of a system including a device that supports DCI activation for semi-persistent SRS resource sets in accordance with one or more aspects of the present disclosure.

FIG. 15 shows a diagram of a system 1500 including a device 1505 that supports DCI activation for semi-persistent SRS resource sets in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting DCI activation for semi-persistent SRS resource sets). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a network entity in accordance with examples as disclosed herein. For example, the communications manager 1520 may be configured as or otherwise support a means for outputting control signaling indicating a resource type of a set of SRS resource sets as semi-persistent and indicating that the set of SRS resource sets are associated with DCI activation. The communications manager 1520 may be configured as or otherwise support a means for outputting a first DCI message indicating an activation of one or more SRS resource sets of the set of SRS resource sets. The communications manager 1520 may be configured as or otherwise support a means for obtaining an SRS during each of a set of multiple periodic occasions associated with the one or more SRS resource sets based on the DCI activation of the one or more SRS resource sets and in accordance with the resource type of the one or more SRS resource sets being semi-persistent.

By including or configuring the communications manager 1520 in accordance with examples as described herein, the device 1505 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of DCI activation for semi-persistent SRS resource sets as described herein, or the processor 1535 and the memory 1525 may be otherwise configured to perform or support such operations.

Figure 16:
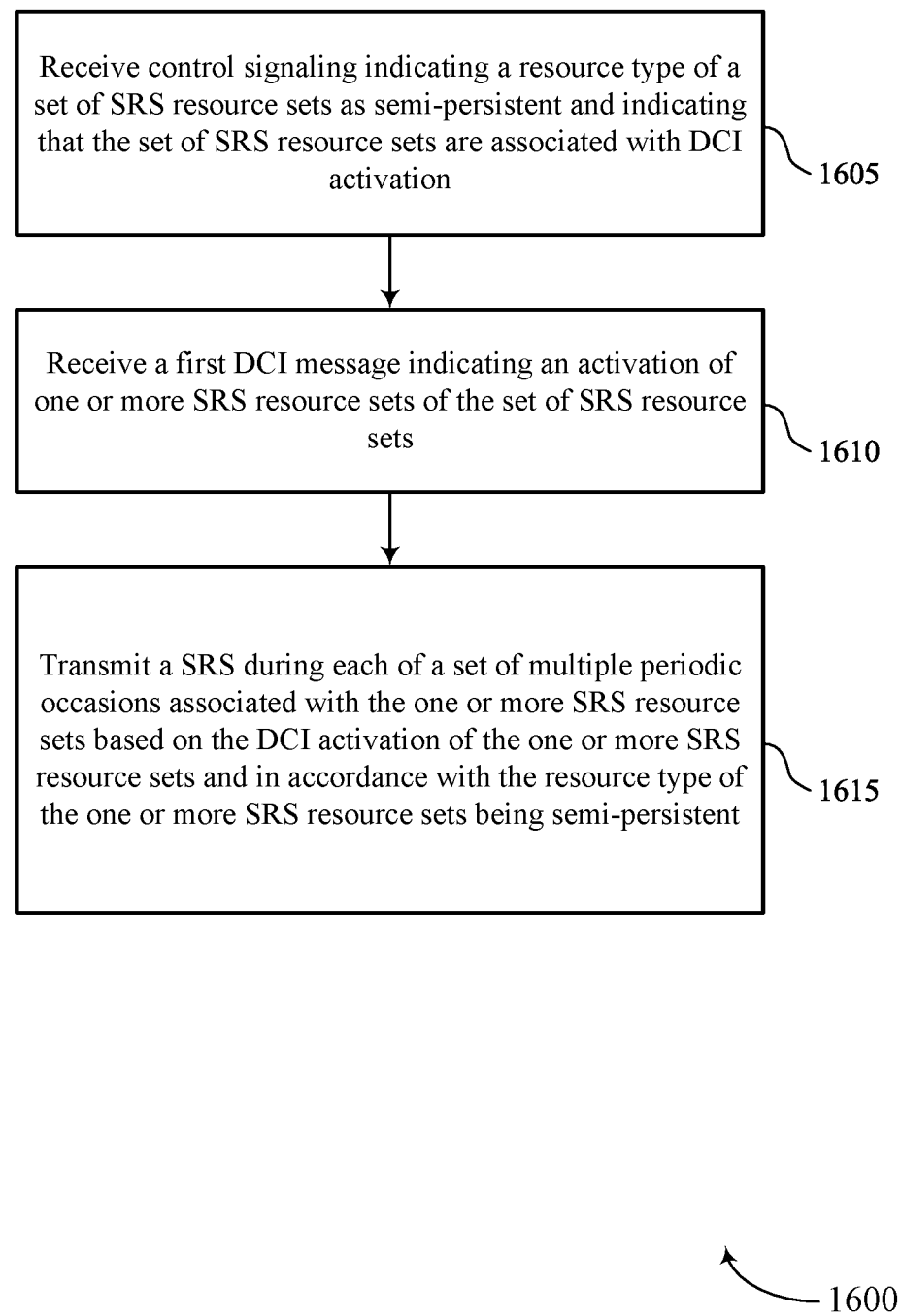
FIGS. 16 and 17 show flowcharts illustrating methods that support DCI activation for semi-persistent SRS resource sets in accordance with one or more aspects of the present disclosure.

FIG. 16 shows a flowchart illustrating a method 1600 that supports DCI activation for semi-persistent SRS resource sets in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving control signaling indicating a resource type of a set of SRS resource sets as semi-persistent and indicating that the set of SRS resource sets are associated with DCI activation. The operations of 1605 may be performed in accordance with examples as disclosed herein. In some examples, aspects of the operations of 1605 may be performed by a control signaling component 1025 as described with reference to FIG. 10.

At 1610, the method may include receiving a first DCI message indicating an activation of one or more SRS resource sets of the set of SRS resource sets. The operations of 1610 may be performed in accordance with examples as disclosed herein. In some examples, aspects of the operations of 1610 may be performed by a DCI component 1030 as described with reference to FIG. 10.

At 1615, the method may include transmitting an SRS during each of a set of multiple periodic occasions associated with the one or more SRS resource sets based on the DCI activation of the one or more SRS resource sets and in accordance with the resource type of the one or more SRS resource sets being semi-persistent. The operations of 1615 may be performed in accordance with examples as disclosed herein. In some examples, aspects of the operations of 1615 may be performed by an SRS component 1035 as described with reference to FIG. 10.

Figure 17:
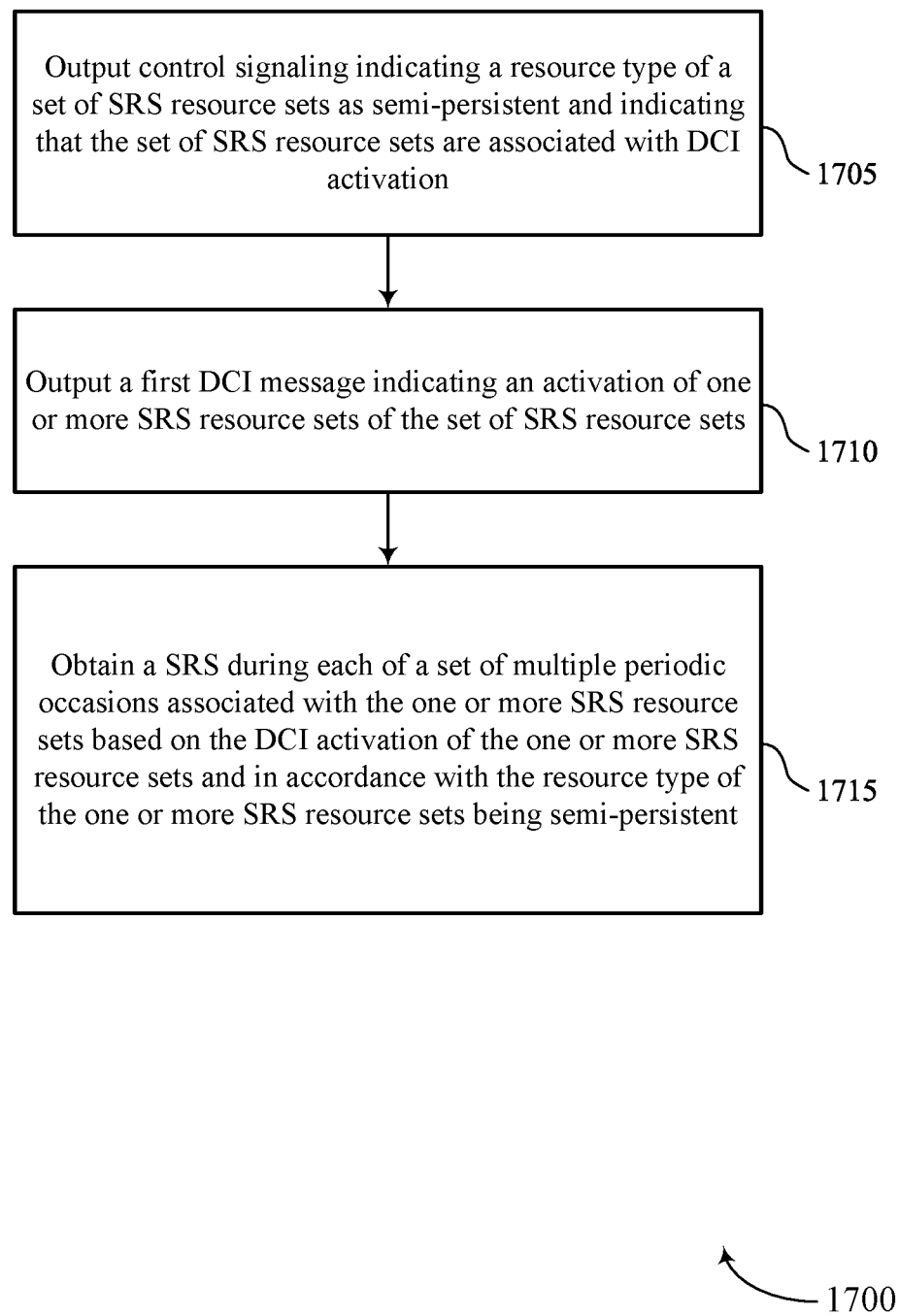

FIG. 17 shows a flowchart illustrating a method 1700 that supports DCI activation for semi-persistent SRS resource sets in accordance with one or more aspects of the present disclosure. The operations of the method 1700 may be implemented by a network entity or its components as described herein. For example, the operations of the method 1700 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1705, the method may include outputting control signaling indicating a resource type of a set of SRS resource sets as semi-persistent and indicating that the set of SRS resource sets are associated with DCI activation. The operations of 1705 may be performed in accordance with examples as disclosed herein. In some examples, aspects of the operations of 1705 may be performed by a control signaling component 1425 as described with reference to FIG. 14.

At 1710, the method may include outputting a first DCI message indicating an activation of one or more SRS resource sets of the set of SRS resource sets. The operations of 1710 may be performed in accordance with examples as disclosed herein. In some examples, aspects of the operations of 1710 may be performed by a DCI component 1430 as described with reference to FIG. 14.

At 1715, the method may include obtaining an SRS during each of a set of multiple periodic occasions associated with the one or more SRS resource sets based on the DCI activation of the one or more SRS resource sets and in accordance with the resource type of the one or more SRS resource sets being semi-persistent. The operations of 1715 may be performed in accordance with examples as disclosed herein. In some examples, aspects of the operations of 1715 may be performed by an SRS component 1435 as described with reference to FIG. 14.

The following provides an overview of aspects of the present disclosure:

Aspect 1: A method for wireless communication at a UE, comprising: receiving control signaling indicating a resource type of a set of SRS resource sets as semi-persistent and indicating that the set of SRS resource sets are associated with DCI activation; receiving a first DCI message indicating an activation of one or more SRS resource sets of the set of SRS resource sets; and transmitting an SRS during each of a plurality of periodic occasions associated with the one or more SRS resource sets based at least in part on the DCI activation of the one or more SRS resource sets and in accordance with the resource type of the one or more SRS resource sets being semi-persistent.

Aspect 2: The method of aspect 1, wherein the control signaling indicates a mapping between a plurality of codepoints and a plurality of sets of one or more SRS resource sets, and wherein receiving the first DCI message indicating the activation of the one or more SRS resource sets comprises: receiving, in the first DCI message, a codepoint of the plurality of codepoints corresponding to the one or more SRS resource sets in accordance with the mapping.

Aspect 3: The method of any of aspects 1 or 2, wherein the control signaling indicates an RNTI associated with a scrambling of activation DCI messages for SRS resource sets having the resource type of semi-persistent, the method further comprising: performing an error check on the first DCI message using a scrambling sequence associated with the RNTI, wherein a successful error check using the scrambling sequence associated with the RNTI indicates that the first DCI message is an activation DCI message for the one or more SRS resource sets.

Aspect 4: The method of any of aspects 1 through 3, wherein the control signaling indicates an association between one or more fields of a DCI message having a plurality of specific values and the DCI message being for activation of SRS resource sets having the resource type of semi-persistent, and wherein receiving the first DCI message indicating the activation of the one or more SRS resource sets comprises: receiving, in the one or more fields of the first DCI message, a set of bits that are set to the plurality of specific values.

Aspect 5: The method of any of aspects 1 through 4, wherein receiving the first DCI message indicating the activation of the one or more SRS resource sets comprises: receiving, in the first DCI message, an indication of an update for one or more parameters associated with the one or more SRS resource sets, wherein transmitting the SRS during each of the plurality of periodic occasions associated with the one or more SRS resource sets is based at least in part on receiving the indication of the update for the one or more parameters.

Aspect 6: The method of aspect 5, wherein the control signaling indicates a value for each of the one or more parameters, the method further comprising: updating the value stored at the UE for each of the one or more parameters based at least in part on the indication of the update for the one or more parameters in the first DCI message, wherein transmitting the SRS during each of the plurality of periodic occasions associated with the one or more SRS resource sets is based at least in part on updating the value for each of the one or more parameters.

Aspect 7: The method of any of aspects 5 or 6, wherein the first DCI message indicates the update for the one or more parameters in accordance with explicitly indicating a value for each of the one or more parameters.

Aspect 8: The method of any of aspects 5 through 7, wherein the control signaling indicates a correspondence between a set of configuration profiles and a set of parameter updates, and the first DCI message indicates the update for the one or more parameters in accordance with indicating a configuration profile of the set of configuration profiles.

Aspect 9: The method of any of aspects 1 through 8, further comprising: receiving a second DCI message indicating an activation of at least one SRS resource set of the one or more SRS resource sets; and discarding the second DCI message in accordance with the second DCI message indicating the activation of the at least one SRS resource set, wherein receiving the second DCI message indicating the activation of the at least one SRS resource set of the one or more SRS resource sets is associated with an error case.

Aspect 10: The method of any of aspects 1 through 8, further comprising: receiving a second DCI message indicating an activation of at least one SRS resource set of the one or more SRS resource sets, wherein the second DCI message includes an indication of an update for one or more parameters associated with the at least one SRS resource set; and updating a value of the one or more parameters associated with the at least one SRS resource set based at least in part on the indication of the update for the one or more parameters and in accordance with the second DCI message indicating the activation of the at least one SRS resource set.

Aspect 11: The method of any of aspects 1 through 10, wherein the control signaling indicates a defined slot number and indicates that occasions of the one or more SRS resource sets are defined relative to the defined slot number, and wherein transmitting the SRS during each of the plurality of periodic occasions associated with the one or more SRS resource sets comprises: transmitting a first SRS in a first occasion of the one or more SRS resource sets after a time gap associated with a processing capability of the UE and an additional offset relative to a slot in which the first DCI message is received.

Aspect 12: The method of aspect 11, further comprising: transmitting, to a network entity, an indication of the time gap associated with the processing capability of the UE.

Aspect 13: The method of any of aspects 1 through 10, wherein the control signaling indicates that occasions of the one or more SRS resource sets are defined relative to a slot in which the first DCI message is received, and wherein transmitting the SRS during each of the plurality of periodic occasions associated with the one or more SRS resource sets comprises: transmitting a first SRS in a first occasion of the one or more SRS resource sets after an offset value relative to the slot in which the first DCI message is received.

Aspect 14: The method of aspect 13, wherein the offset value is received via at least one of the control signaling or the first DCI message.

Aspect 15: The method of any of aspects 1 through 14, further comprising: receiving a second DCI message indicating a deactivation of the one or more SRS resource sets, wherein the second DCI message indicates the deactivation of the one or more SRS resource sets based at least in part on at least one of being scrambled in accordance with an RNTI associated with deactivation DCI messages for SRS resource sets having the resource type of semi-persistent or one or more fields of the second DCI message having a plurality of specific values.

Aspect 16: A method for wireless communication at a network entity, comprising: outputting control signaling indicating a resource type of a set of SRS resource sets as semi-persistent and indicating that the set of SRS resource sets are associated with DCI activation; outputting a first DCI message indicating an activation of one or more SRS resource sets of the set of SRS resource sets; and obtaining an SRS during each of a plurality of periodic occasions associated with the one or more SRS resource sets based at least in part on the DCI activation of the one or more SRS resource sets and in accordance with the resource type of the one or more SRS resource sets being semi-persistent.

Aspect 17: The method of aspect 16, wherein the control signaling indicates a mapping between a plurality of codepoints and a plurality of sets of one or more SRS resource sets, and wherein outputting the first DCI message indicating the activation of the one or more SRS resource sets comprises: outputting, in the first DCI message, a codepoint of the plurality of codepoints corresponding to the one or more SRS resource sets in accordance with the mapping.

Aspect 18: The method of any of aspects 16 or 17, wherein the control signaling indicates an RNTI associated with a scrambling of activation DCI messages for SRS resource sets having the resource type of semi-persistent, the method further comprising: scrambling the first DCI message using a scrambling sequence associated with the RNTI in accordance with the first DCI message being an activation DCI message for the one or more SRS resource sets.

Aspect 19: The method of any of aspects 16 through 18, wherein the control signaling indicates an association between one or more fields of a DCI message having a plurality of specific values and the DCI message being for activation of SRS resource sets having the resource type of semi-persistent, and wherein outputting the first DCI message indicating the activation of the one or more SRS resource sets comprises: outputting, in the one or more fields of the first DCI message, a set of bits that are set to the plurality of specific values.

Aspect 20: The method of any of aspects 16 through 19, wherein outputting the first DCI message indicating the activation of the one or more SRS resource sets comprises: outputting, in the first DCI message, an indication of an update for one or more parameters associated with the one or more SRS resource sets, wherein obtaining the SRS during each of the plurality of periodic occasions associated with the one or more SRS resource sets is based at least in part on transmitting the indication of the update for the one or more parameters.

Aspect 21: The method of aspect 20, wherein the control signaling indicates a value for each of the one or more parameters, the method further comprising: updating the value stored at the network entity for each of the one or more parameters based at least in part on the indication of the update for the one or more parameters in the first DCI message, wherein obtaining the SRS during each of the plurality of periodic occasions associated with the one or more SRS resource sets is based at least in part on updating the value for each of the one or more parameters.

Aspect 22: The method of any of aspects 20 or 21, wherein the first DCI message indicates the update for the one or more parameters in accordance with explicitly indicating a value for each of the one or more parameters.

Aspect 23: The method of any of aspects 20 through 22, wherein the control signaling indicates a correspondence between a set of configuration profiles and a set of parameter updates, and the first DCI message indicates the update for the one or more parameters in accordance with indicating a configuration profile of the set of configuration profiles.

Aspect 24: The method of any of aspects 16 through 23, further comprising: generating a second DCI message indicating an activation of at least one SRS resource set of the one or more SRS resource sets; and discarding the second DCI message in accordance with the second DCI message indicating the activation of the at least one SRS resource set, wherein generating the second DCI message indicating the activation of the at least one SRS resource set of the one or more SRS resource sets is associated with an error case.

Aspect 25: The method of any of aspects 16 through 23, further comprising: outputting a second DCI message indicating an activation of at least one SRS resource set of the one or more SRS resource sets, wherein the second DCI message includes an indication of an update for one or more parameters associated with the at least one SRS resource set; and updating a value of the one or more parameters associated with the at least one SRS resource set based at least in part on the indication of the update for the one or more parameters and in accordance with the second DCI message indicating the activation of the at least one SRS resource set.

Aspect 26: The method of any of aspects 16 through 25, wherein the control signaling indicates a defined slot number and indicates that occasions of the one or more SRS resource sets are defined relative to the defined slot number, and wherein obtaining the SRS during each of the plurality of periodic occasions associated with the one or more SRS resource sets comprises: obtaining a first SRS in a first occasion of the one or more SRS resource sets after a time gap associated with a processing capability of a UE and an additional offset relative to a slot in which the first DCI message is output.

Aspect 27: The method of aspect 26, further comprising: obtaining an indication of the time gap associated with the processing capability of the UE.

Aspect 28: The method of any of aspects 16 through 25, wherein the control signaling indicates that occasions of the one or more SRS resource sets are defined relative to a slot in which the first DCI message is output, and wherein obtaining the SRS during each of the plurality of periodic occasions associated with the one or more SRS resource sets comprises: obtaining a first SRS in a first occasion of the one or more SRS resource sets after an offset value relative to the slot in which the first DCI message is output.

Aspect 29: The method of aspect 28, wherein the offset value is received via at least one of the control signaling or the first DCI message.

Aspect 30: The method of any of aspects 16 through 29, further comprising: outputting a second DCI message indicating a deactivation of the one or more SRS resource sets, wherein the second DCI message indicates the deactivation of the one or more SRS resource sets based at least in part on at least one of being scrambled in accordance with an RNTI associated with deactivation DCI messages for SRS resource sets having the resource type of semi-persistent or one or more fields of the second DCI message having a plurality of specific values.

Aspect 31: An apparatus for wireless communication at a UE, comprising a processor; memory coupled with the processor; and instructions stored in the memory and executable by the processor to cause the apparatus to perform a method of any of aspects 1 through 15.

Aspect 32: An apparatus for wireless communication at a UE, comprising at least one means for performing a method of any of aspects 1 through 15.

Aspect 33: A non-transitory computer-readable medium storing code for wireless communication at a UE, the code comprising instructions executable by a processor to perform a method of any of aspects 1 through 15.

Aspect 34: An apparatus for wireless communication at a network entity, comprising a processor; memory coupled with the processor; and instructions stored in the memory and executable by the processor to cause the apparatus to perform a method of any of aspects 16 through 30.

Aspect 35: An apparatus for wireless communication at a network entity, comprising at least one means for performing a method of any of aspects 16 through 30.

Aspect 36: A non-transitory computer-readable medium storing code for wireless communication at a network entity, the code comprising instructions executable by a processor to perform a method of any of aspects 16 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors; and
   one or more memories coupled with the one or more processors and storing instructions executable by the one or more processors to cause the apparatus to:
   receive control signaling indicating a resource type of a plurality of sounding reference signal resource sets as semi-persistent and indicating that the plurality of sounding reference signal resource sets is associated with downlink control information activation;
   receive a first downlink control information message indicating an activation of one or more sounding reference signal resource sets of the plurality of sounding reference signal resource sets; and
   transmit a sounding reference signal during each of a plurality of periodic occasions associated with the one or more sounding reference signal resource sets based at least in part on the activation of the one or more sounding reference signal resource sets indicated by the first downlink control information message and in accordance with the resource type of the one or more sounding reference signal resource sets being semi-persistent.

2. The apparatus of claim 1, wherein the control signaling indicates a mapping between a plurality of codepoints and the plurality of sounding reference signal resource sets, and wherein the instructions to receive the first downlink control information message indicating the activation of the one or more sounding reference signal resource sets are executable by the one or more processors to cause the apparatus to:
   receive, in the first downlink control information message, a codepoint of the plurality of codepoints corresponding to the one or more sounding reference signal resource sets in accordance with the mapping.

3. The apparatus of claim 1, wherein the control signaling indicates a radio network temporary identifier associated with a scrambling of activation downlink control information messages for sounding reference signal resource sets having the resource type of semi-persistent, and the instructions are further executable by the one or more processors to cause the apparatus to:
   perform an error check on the first downlink control information message using a scrambling sequence associated with the radio network temporary identifier, wherein a successful error check using the scrambling sequence associated with the radio network temporary identifier indicates that the first downlink control information message is an activation downlink control information message for the one or more sounding reference signal resource sets.

4. The apparatus of claim 1, wherein the control signaling indicates an association between one or more fields of a downlink control information message having a plurality of specific values and the downlink control information message being for activation of sounding reference signal resource sets having the resource type of semi-persistent, and wherein the instructions to receive the first downlink control information message indicating the activation of the one or more sounding reference signal resource sets are executable by the one or more processors to cause the apparatus to:

receive, in the one or more fields of the first downlink control information message, a set of bits that are equal to the plurality of specific values.

5. The apparatus of claim 1, wherein the instructions to receive the first downlink control information message indicating the activation of the one or more sounding reference signal resource sets are executable by the one or more processors to cause the apparatus to:
receive, in the first downlink control information message, an indication of an update for one or more parameters associated with the one or more sounding reference signal resource sets,
wherein transmission of the sounding reference signal during each of the plurality of periodic occasions associated with the one or more sounding reference signal resource sets is based at least in part on receiving the indication of the update for the one or more parameters.

6. The apparatus of claim 5, wherein the control signaling indicates a value for each of the one or more parameters, and the instructions are further executable by the one or more processors to cause the apparatus to:
update the value stored at the UE for each of the one or more parameters based at least in part on the indication of the update for the one or more parameters in the first downlink control information message,
wherein transmission of the sounding reference signal during each of the plurality of periodic occasions associated with the one or more sounding reference signal resource sets is based at least in part on the update to the value for each of the one or more parameters.

7. The apparatus of claim 5, wherein the first downlink control information message indicates the update for the one or more parameters in accordance with explicitly indicating a value for each of the one or more parameters.

8. The apparatus of claim 5, wherein:
the control signaling indicates a correspondence between a set of configuration profiles and a set of parameter updates; and
the first downlink control information message indicates the update for the one or more parameters in accordance with indicating a configuration profile of the set of configuration profiles.

9. The apparatus of claim 1, wherein the instructions are further executable by the one or more processors to cause the apparatus to:
receive a second downlink control information message indicating an activation of at least one sounding reference signal resource set of the one or more sounding reference signal resource sets; and
discard the second downlink control information message in accordance with the second downlink control information message indicating the activation of the at least one sounding reference signal resource set,
wherein reception of the second downlink control information message indicating the activation of the at least one sounding reference signal resource set of the one or more sounding reference signal resource sets is associated with an error case.

10. The apparatus of claim 1, wherein the instructions are further executable by the one or more processors to cause the apparatus to:
receive a second downlink control information message indicating an activation of at least one sounding reference signal resource set of the one or more sounding reference signal resource sets, wherein the second downlink control information message includes an indication of an update for one or more parameters associated with the at least one sounding reference signal resource set; and
update a value of the one or more parameters associated with the at least one sounding reference signal resource set based at least in part on the indication of the update for the one or more parameters and in accordance with the second downlink control information message indicating the activation of the at least one sounding reference signal resource set.

11. The apparatus of claim 1, wherein the control signaling indicates a defined slot number, wherein occasions of the one or more sounding reference signal resource sets are defined relative to the defined slot number, and wherein the instructions to transmit the sounding reference signal during each of the plurality of periodic occasions associated with the one or more sounding reference signal resource sets are executable by the one or more processors to cause the apparatus to:
transmit a first sounding reference signal in a first occasion of the one or more sounding reference signal resource sets after a time gap associated with a processing capability of the UE and an additional offset relative to a slot in which the first downlink control information message is received.

12. The apparatus of claim 11, wherein the instructions are further executable by the one or more processors to cause the apparatus to:
transmit, to a network entity, an indication of the time gap associated with the processing capability of the UE.

13. The apparatus of claim 1, wherein the control signaling indicates that occasions of the one or more sounding reference signal resource sets are defined relative to a slot in which the first downlink control information message is received, and wherein the instructions to transmit the sounding reference signal during each of the plurality of periodic occasions associated with the one or more sounding reference signal resource sets are executable by the one or more processors to cause the apparatus to:
transmit a first sounding reference signal in a first occasion of the one or more sounding reference signal resource sets after an offset value relative to the slot in which the first downlink control information message is received.

14. The apparatus of claim 13, wherein the offset value is received via at least one of the control signaling or the first downlink control information message.

15. The apparatus of claim 1, wherein the instructions are further executable by the one or more processors to cause the apparatus to:
receive a second downlink control information message indicating a deactivation of the one or more sounding reference signal resource sets.

16. The apparatus of claim 15, wherein the second downlink control information message indicates the deactivation of the one or more sounding reference signal resource sets based at least in part on at least one of:
being scrambled in accordance with a radio network temporary identifier associated with deactivation downlink control information messages for sounding reference signal resource sets having the resource type of semi-persistent; or
one or more fields of the second downlink control information message having a plurality of specific values.

17. An apparatus for wireless communication at a network entity, comprising:
one or more processors; and
one or more memories coupled with the one or more processors and storing instructions executable by the one or more processors to cause the apparatus to:
transmit output control signaling indicating a resource type of a plurality of sounding reference signal resource sets as semi-persistent and indicating that the plurality of sounding reference signal resource sets is associated with downlink control information activation;
transmit output a first downlink control information message indicating an activation of one or more sounding reference signal resource sets of the plurality of sounding reference signal resource sets; and
receive obtain a sounding reference signal during each of a plurality of periodic occasions associated with the one or more sounding reference signal resource sets based at least in part on the activation of the one or more sounding reference signal resource sets indicated by the first downlink control information message and in accordance with the resource type of the one or more sounding reference signal resource sets being semi-persistent.

18. The apparatus of claim 17, wherein the control signaling indicates a mapping between a plurality of codepoints and the plurality of sounding reference signal resource sets, and wherein the instructions to transmit the first downlink control information message indicating the activation of the one or more sounding reference signal resource sets are executable by the one or more processors to cause the apparatus to:
transmit, in the first downlink control information message, a codepoint of the plurality of codepoints corresponding to the one or more sounding reference signal resource sets in accordance with the mapping.

19. The apparatus of claim 17, wherein the control signaling indicates a radio network temporary identifier associated with a scrambling of activation downlink control information messages for sounding reference signal resource sets having the resource type of semi-persistent, and the instructions are further executable by the one or more processors to cause the apparatus to:
scramble the first downlink control information message using a scrambling sequence associated with the radio network temporary identifier in accordance with the first downlink control information message being an activation downlink control information message for the one or more sounding reference signal resource sets.

20. The apparatus of claim 17, wherein the control signaling indicates an association between one or more fields of a downlink control information message having a plurality of specific values and the downlink control information message being for activation of sounding reference signal resource sets having the resource type of semi-persistent, and wherein the instructions to transmit the first downlink control information message indicating the activation of the one or more sounding reference signal resource sets are executable by the one or more processors to cause the apparatus to:
transmit, in the one or more fields of the first downlink control information message, a set of bits that are equal to the plurality of specific values.

21. The apparatus of claim 17, wherein the instructions to transmit the first downlink control information message indicating the activation of the one or more sounding reference signal resource sets are executable by the one or more processors to cause the apparatus to:
transmit, in the first downlink control information message, an indication of an update for one or more parameters associated with the one or more sounding reference signal resource sets,
wherein reception of the sounding reference signal during each of the plurality of periodic occasions associated with the one or more sounding reference signal resource sets is based at least in part on transmitting the indication of the update for the one or more parameters.

22. The apparatus of claim 21, wherein the control signaling indicates a value for each of the one or more parameters, and the instructions are further executable by the one or more processors to cause the apparatus to:
update the value stored at the network entity for each of the one or more parameters based at least in part on the indication of the update for the one or more parameters in the first downlink control information message,
wherein reception of the sounding reference signal during each of the plurality of periodic occasions associated with the one or more sounding reference signal resource sets is based at least in part on the update to the value for each of the one or more parameters.

23. The apparatus of claim 17, wherein the instructions are further executable by the one or more processors to cause the apparatus to:
generate a second downlink control information message indicating an activation of at least one sounding reference signal resource set of the one or more sounding reference signal resource sets; and
discard the second downlink control information message in accordance with the second downlink control information message indicating the activation of the at least one sounding reference signal resource set,
wherein generation of the second downlink control information message indicating the activation of the at least one sounding reference signal resource set of the one or more sounding reference signal resource sets is associated with an error case.

24. The apparatus of claim 17, wherein the instructions are further executable by the one or more processors to cause the apparatus to:
transmit a second downlink control information message indicating an activation of at least one sounding reference signal resource set of the one or more sounding reference signal resource sets, wherein the second downlink control information message includes an indication of an update for one or more parameters associated with the at least one sounding reference signal resource set; and
update a value of the one or more parameters associated with the at least one sounding reference signal resource set based at least in part on the indication of the update for the one or more parameters and in accordance with the second downlink control information message indicating the activation of the at least one sounding reference signal resource set.

25. The apparatus of claim 17, wherein the instructions are further executable by the one or more processors to cause the apparatus to:
transmit a second downlink control information message indicating a deactivation of the one or more sounding reference signal resource sets, wherein the second downlink control information message indicates the deactivation of the one or more sounding reference signal resource sets based at least in part on at least one of:
- being scrambled in accordance with a radio network temporary identifier associated with deactivation downlink control information messages for sounding reference signal resource sets having the resource type of semi-persistent; or
- one or more fields of the second downlink control information message having a plurality of specific values.

26. A method for wireless communication at a user equipment (UE), comprising:
- receiving control signaling indicating a resource type of a plurality of sounding reference signal resource sets as semi-persistent and indicating that the plurality of sounding reference signal resource sets is associated with downlink control information activation;
- receiving a first downlink control information message indicating an activation of one or more sounding reference signal resource sets of the plurality of sounding reference signal resource sets; and
- transmitting a sounding reference signal during each of a plurality of periodic occasions associated with the one or more sounding reference signal resource sets based at least in part on the activation of the one or more sounding reference signal resource sets indicated by the first downlink control information message and in accordance with the resource type of the one or more sounding reference signal resource sets being semi-persistent.

27. The method of claim 26, wherein the control signaling indicates a mapping between a plurality of codepoints and the plurality of sounding reference signal resource sets, and wherein receiving the first downlink control information message indicating the activation of the one or more sounding reference signal resource sets comprises:
- receiving, in the first downlink control information message, a codepoint of the plurality of codepoints corresponding to the one or more sounding reference signal resource sets in accordance with the mapping.

28. The method of claim 26, wherein the control signaling indicates a radio network temporary identifier associated with a scrambling of activation downlink control information messages for sounding reference signal resource sets having the resource type of semi-persistent, the method further comprising:
- performing an error check on the first downlink control information message using a scrambling sequence associated with the radio network temporary identifier,
- wherein a successful error check using the scrambling sequence associated with the radio network temporary identifier indicates that the first downlink control information message is an activation downlink control information message for the one or more sounding reference signal resource sets.

29. A method for wireless communication at a network entity, comprising:
- transmitting control signaling indicating a resource type of a plurality of sounding reference signal resource sets as semi-persistent and indicating that the plurality of sounding reference signal resource sets is associated with downlink control information activation;
- transmitting a first downlink control information message indicating an activation of one or more sounding reference signal resource sets of the plurality of sounding reference signal resource sets; and
- receiving a sounding reference signal during each of a plurality of periodic occasions associated with the one or more sounding reference signal resource sets based at least in part on the activation of the one or more sounding reference signal resource sets indicated by the first downlink control information message and in accordance with the resource type of the one or more sounding reference signal resource sets being semi-persistent.

30. The method of claim 29, wherein the control signaling indicates a mapping between a plurality of codepoints and the plurality of sounding reference signal resource sets, and wherein transmitting the first downlink control information message indicating the activation of the one or more sounding reference signal resource sets comprises:
- transmitting, in the first downlink control information message, a codepoint of the plurality of codepoints corresponding to the one or more sounding reference signal resource sets in accordance with the mapping.

* * * * *